(12) United States Patent
Saitoh et al.

(10) Patent No.: US 11,988,880 B2
(45) Date of Patent: May 21, 2024

(54) OPTICAL COUPLING SYSTEM AND OPTICAL COMMUNICATION DEVICE

(71) Applicant: FUJIFILM Corporation, Tokyo (JP)

(72) Inventors: Yukito Saitoh, Minamiashigara (JP); Katsumi Sasata, Minamiashigara (JP); Hiroshi Sato, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/886,535

(22) Filed: Aug. 12, 2022

(65) Prior Publication Data

US 2022/0382000 A1 Dec. 1, 2022

Related U.S. Application Data

(63) Continuation of application No. PCT/JP2021/004771, filed on Feb. 9, 2021.

(30) Foreign Application Priority Data

Feb. 14, 2020 (JP) .................................. 2020-023146
Sep. 25, 2020 (JP) .................................. 2020-161284

(51) Int. Cl.
*G02B 6/42* (2006.01)
*H04B 10/50* (2013.01)

(52) U.S. Cl.
CPC .......... *G02B 6/4213* (2013.01); *H04B 10/501* (2013.01)

(58) Field of Classification Search
CPC ................................................. G02B 6/4213
See application file for complete search history.

(56) References Cited

U.S. PATENT DOCUMENTS 4,702,557 A * 10/1987 Beckmann .............. G02F 1/315
349/197
5,740,288 A 4/1998 Pan
(Continued)

FOREIGN PATENT DOCUMENTS

JP  2010-32807 A  2/2010
JP  2015-505995 A  2/2015
(Continued)

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/JP2021/004771, dated Aug. 25, 2022.
(Continued)

*Primary Examiner* — Sung H Pak
(74) *Attorney, Agent, or Firm* — Birch, Stewart, Kolasch & Birch, LLP

(57) ABSTRACT

Provided are a small-sized optical coupling system and an optical communication device using the optical coupling system. An optical coupling system includes a liquid crystal optical element, and a photonic device having a plurality of photonic chips, and couples an optical fiber to the photonic device, in which each of the photonic chips includes a grating coupler, the liquid crystal optical element separates incident signal light depending on at least one of polarization or a wavelength to emit light in different directions, and each separated signal light component is incident into the grating coupler of the corresponding photonic chip.

17 Claims, 14 Drawing Sheets

(56) References Cited

U.S. PATENT DOCUMENTS

| | | |
|---|---|---|
| 9,927,575 B2 * | 3/2018 | Goodwill .................. G02B 6/34 |
| 2012/0188467 A1 | 7/2012 | Escuti et al. |
| 2015/0185583 A1 | 7/2015 | Mao et al. |
| 2016/0011353 A1 | 1/2016 | Escuti et al. |
| 2016/0282559 A1 | 9/2016 | Onaka |
| 2016/0377811 A1 | 12/2016 | Goodwill et al. |
| 2021/0026062 A1 | 1/2021 | Sato et al. |

FOREIGN PATENT DOCUMENTS

| | | |
|---|---|---|
| JP | 2018-519327 A | 6/2016 |
| WO | WO 2014/091614 A1 | 6/2014 |
| WO | WO 2018/208537 A1 | 12/2016 |
| WO | WO 2019/189809 A1 | 10/2019 |

OTHER PUBLICATIONS

International Search Report (Form PCT/ISA/210) for International Application No. PCT/JP2021/004771, dated May 11, 2021, with English translation.

Japanese Notice of Reasons for Refusal for corresponding Japanese Application No. 2022-500421, dated Jun. 6, 2023, with an English translation.

Japanese Notice of Reasons for Refusal for corresponding Japanese Application No. 2022-500421, dated Nov. 7, 2023, with an English translation.

\* cited by examiner

OPTICAL COUPLING SYSTEM AND OPTICAL COMMUNICATION DEVICE

CROSS-REFERENCE TO RELATED APPLICATIONS

This application is a Continuation of PCT International Application No. PCT/JP2021/004771 filed on Feb. 9, 2021, which claims priority under 35 U.S.C. § 119(a) to Japanese Patent Application No. 2020-023146 filed on Feb. 14, 2020 and Japanese Patent Application No. 2020-161284 filed on Sep. 25, 2020. Each of the above applications is hereby expressly incorporated by reference, in its entirety, into the present application.

BACKGROUND OF THE INVENTION

1. Field of the Invention

The present invention relates to an optical coupling system and an optical communication device using the optical coupling system.

2. Description of the Related Art

With an increase in quantity of communication data every year, a communication device is required to have a higher capacity.

In addition to an optical fiber that configures a backbone network of the communication device, a photonic device that couples the optical fiber to a repeater, a terminal, or the like continuously changes in various ways for a higher capacity. Among these, an optical coupling system that has a two-dimensional optical fiber array, applies a polarization multiplex mode, and is a high capacity in an optical transceiver has been suggested (for example, WO2016/206537A).

SUMMARY OF THE INVENTION

In WO2016/206537A, as a beam displacer that separates a plurality of signal light emitted from an optical fiber, an optically anisotropic liquid crystal material, such as yttrium vanadate ($YVO_4$), α-barium borate (α-BBO), calcite ($CaCO_3$), or rutile ($TiO_2$), is described.

The beam displacer requires collimated incident light. For this reason, the beam displacer should be combined with a microlens array, and this is a bottleneck in a reduction in size of the optical coupling system.

Accordingly, an object of the present invention is to provide a smaller-sized optical coupling system.

Another object of the present invention is to provide an optical communication device using the optical coupling system.

The inventors have found that the above-described object can be achieved with the following configuration.

[1] An optical coupling system comprising:
a liquid crystal optical element, and
a photonic device having a plurality of photonic chips,
in which the optical coupling system couples an optical fiber to the photonic device,
each of the plurality of photonic chips includes a grating coupler,
the liquid crystal optical element separates light incident from the optical fiber depending on at least one of polarization or a wavelength and emits light in different directions, and each of light components separated by the liquid crystal optical element is incident into the grating coupler of the corresponding photonic chip.

[2] The optical coupling system according to [1],
in which the optical coupling system deals with an optical fiber array having a plurality of the optical fibers, and
the optical coupling system has the liquid crystal optical element corresponding to each of the optical fibers of the optical fiber array.

[3] The optical coupling system according to [1] or [2],
in which the liquid crystal optical element is a transmissive liquid crystal optical element that has a sheet shape and emits light incident from a first main surface facing the optical fiber from a second main surface different from the first main surface.

[4] The optical coupling system according to [3],
in which the transmissive liquid crystal optical element has an optically anisotropic layer formed of a composition containing a liquid crystal compound, and
the optically anisotropic layer has a liquid crystal alignment pattern in which an orientation of an optical axis derived from the liquid crystal compound changes while continuously rotating toward at least one in-plane direction.

[5] The optical coupling system according to [1] or [2],
in which the liquid crystal optical element is a reflective liquid crystal optical element that has a sheet shape and reflects light incident from a first main surface facing the optical fiber to emit the light from the first main surface.

[6] The optical coupling system according to [5],
in which the reflective liquid crystal optical element has a cholesteric liquid crystal layer formed by cholesterically aligning a liquid crystal compound, and
the cholesteric liquid crystal layer has a liquid crystal alignment pattern in which an orientation of an optical axis derived from the liquid crystal compound changes while continuously rotating along at least one in-plane direction.

[7] The optical coupling system according to any one of [1] to [6],
in which the liquid crystal optical element is a light collecting liquid crystal optical element that collects incident light to emit the light toward the grating coupler.

[8] The optical coupling system according to [7],
in which the light collecting liquid crystal optical element has a liquid crystal layer having a liquid crystal compound, and
the liquid crystal layer has a liquid crystal alignment pattern in which an orientation of an optical axis derived from the liquid crystal compound changes while continuously rotating toward one in-plane direction, in a radial shape from an inside toward an outside.

[9] The optical coupling system according to any one of [1] to [8],
in which the liquid crystal optical element separates incident light depending on a direction of a polarizing axis to emit the light in different directions.

[10] An optical communication device comprising:
the optical coupling system according to any one of [1] to [9].

According to the present invention, it is possible to provide a small-sized optical coupling system.

In addition, according to the present invention, it is possible to provide a small-sized optical communication device using the optical coupling system.

DESCRIPTION OF THE PREFERRED EMBODIMENTS

Figure 1:
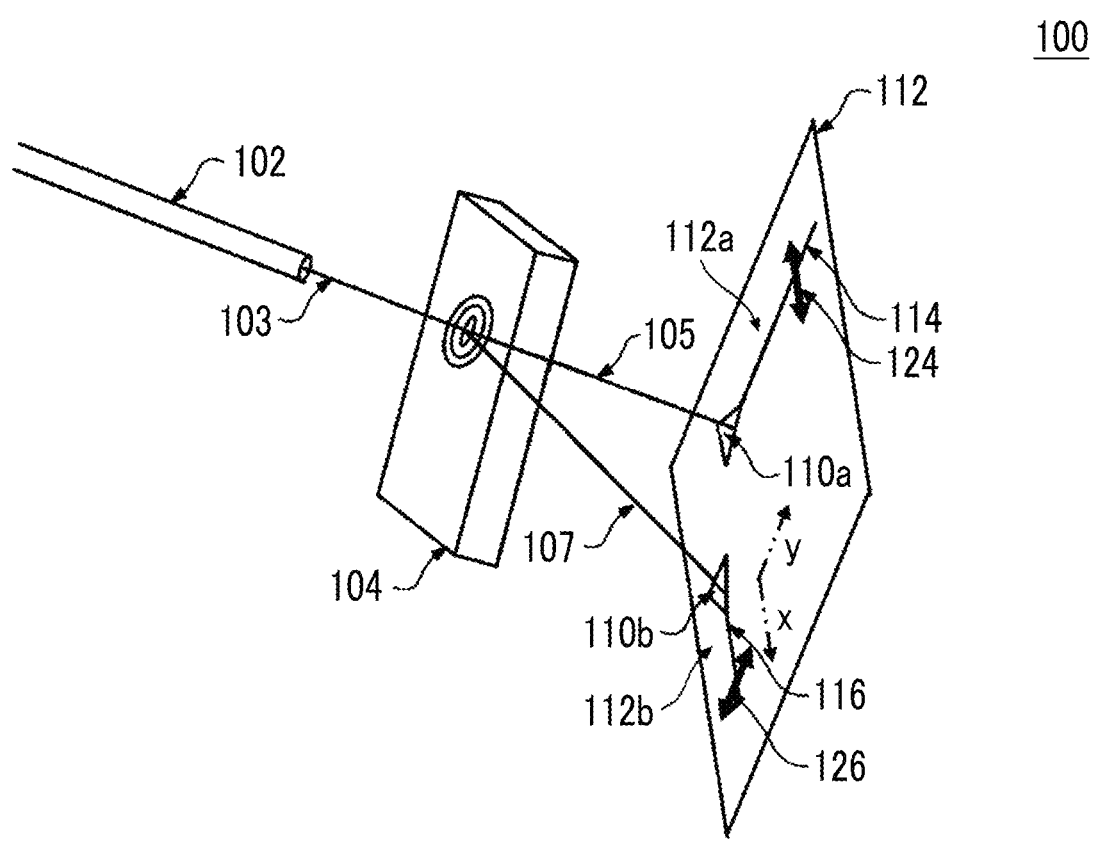
FIG. 1 is a conceptual diagram of an example of an optical coupling system of the present invention.

Hereinafter, the present invention will be described in detail.

The description of the constituent elements described below is provided based on a representative embodiment of the present invention, but the present invention is not limited to such an embodiment.

In the specification, a numerical range represented using "to" means a range including numerical values before and after "to" as a lower limit value and an upper limit value.

In a preferred aspect of an optical coupling system of the present invention, the optical coupling system includes a liquid crystal optical element, and a photonic device having a plurality of photonic chips, and couples an optical fiber to the photonic device, and specifically, the photonic chip of the photonic device.

The photonic chip is a device that converts an incident optical signal into an electrical signal. An optical signal emitted from the optical fiber is separated depending on polarization and/or a wavelength by a liquid crystal optical element that acts as a beam displacer (optical displacer). Thereafter, the optical signal is incident into the photonic chip and is converted into an electrical signal to form one channel.

In a case where the optical fiber has a polarization and/or wavelength multi-mode, the optical signal emitted from the optical fiber is separated depending on polarization and/or a wavelength by the liquid crystal optical element, and the separated optical signals are distributed to a plurality of photonic chips and coupled. With this, multi-channel optical communication can be realized.

Each of the photonic chips includes a grating coupler.

The optical signal emitted from the optical fiber and separated by the liquid crystal optical element is incident into the grating coupler of the corresponding photonic chip. Accordingly, the optical signal is coupled to a waveguide and is converted into an electrical signal through a photoelectric conversion element.

The grating coupler can be given polarization selectivity and/or wavelength selectivity. In particular, the polarization selectivity can be selected from transverse magnetic field (TM) polarization selectivity and transverse electric field (TE) polarization selectivity. The TM polarization selectivity is also referred to as vertical polarization selectivity. The TE polarization selectivity is also referred to as horizontal polarization selectivity.

As the grating coupler, a known grating coupler can be used. Examples of the grating coupler include a surface grating coupler using a surface grating and a liquid crystal grating using a liquid crystal material.

The configuration of the photonic chip and the optical characteristic of the grating coupler can be designed to increase coupling efficiency depending on an incident angle at which signal light is incident into the grating coupler, a polarized component, and a wavelength in the optical coupling system to be applied.

A plurality of photonic chips, that is, a plurality of grating couplers are mounted in one photonic device, and can realize multi-channels by performing separation depending on polarization and/or a wavelength.

FIG. 1 is a conceptual diagram of an example of an optical coupling system of the present invention.

An optical coupling system 100 shown in FIG. 1 separates signal light 103 emitted from an optical fiber 102 depending on polarization as an example and makes each separated signal light be incident into the photonic chip corresponding to each polarized light of the photonic device 112, thereby coupling the optical fiber 102 and the photonic device 112 (photonic chip).

The optical coupling system 100 shown in FIG. 1 has a liquid crystal optical element 104 and the photonic device 112. The photonic device 112 has a plurality of photonic chips. The photonic device 112 of the example shown in the drawing has two photonic chips of photonic chip 112a and 112b.

The photonic chip 112a has a grating coupler 110a and a photoelectric conversion element (not shown). On the other hand, the photonic chip 112b has a grating coupler 110b and a photoelectric conversion element (not shown).

The signal light 103 from the optical fiber 102 is separated into components having different polarization (polarization and/or a wavelength) by the liquid crystal optical element 104, and the separated signal light components are emitted toward different directions. Typically, the liquid crystal optical element 104 spatially separates the signal light 103 including two polarized components perpendicular to each other into signal light 105 and signal light 107 each including a single polarized component, such as TE polarization or TM polarization, and emits the signal light 105 and the signal light 107 in different directions. The liquid crystal optical element 104 will be described below in detail.

The signal light 105 and the signal light 107 emitted from the liquid crystal optical element 104 reach the photonic device 112.

As described above, the photonic device 112 has the two photonic chips of the photonic chips 112a and 112b. As an example, the signal light 105 is incident into the grating coupler 110a of the photonic chip 112a, and the signal light 107 is incident into the grating coupler 110b of the photonic chip 112b.

As a preferred aspect, the grating coupler 110a and the grating coupler 110b have the same polarization selectivity and are disposed to be perpendicular to each other on the photonic device 112. With this, both different polarized components perpendicular to each other can be coupled with high efficiency.

In FIG. 1, as an example, the signal light 105 is polarized light 124 in an X-axis direction and is coupled to the grating coupler 110a. On the other hand, the signal light 107 is polarized light 126 in a Y-axis direction and is coupled to the grating coupler 110b.

In this case, a layout axis (waveguide) 114 of the grating coupler 110a and a layout axis (waveguide) 116 of the grating coupler 110b are disposed to be perpendicular to each other. With this, there are advantages in that the grating couplers can be set with, for example, the grating coupler having the TE polarization selectivity, the complexity of the system is avoided, and the system can be constructed with a small number of kinds of parts.

The signal light 105 (polarized light 124) incident into the grating coupler 110a is converted from signal light into an electrical signal by the photoelectric conversion element (not shown) disposed ahead of the layout axis 114.

On the other hand, the signal light 107 (polarized light 126) incident into the grating coupler 110b is converted from signal light into an electrical signal by the photoelectric conversion element (not shown) disposed ahead of the layout axis 116.

In FIG. 1, to simplify the drawing and to clarify the configuration of the optical coupling system of the present invention, although description has been described using the single optical fiber and the signal light composed of two different polarized components, the optical coupling system of the present invention may couple a two-dimensional optical fiber array in which optical fibers are bundled, and the photonic device.

The photonic chips (grating couplers) mounted in the photonic device may be a shape of many arrays corresponding to the optical fiber array.

In such a multi-input-multi-output type optical coupling system, a plurality of liquid crystal optical elements 104 are provided in an array corresponding to the optical fibers of the optical fiber array. That is, in the multi-input-multi-output type optical coupling system, a liquid crystal optical element array in which the liquid crystal optical elements are arranged may be provided.

Figure 2:
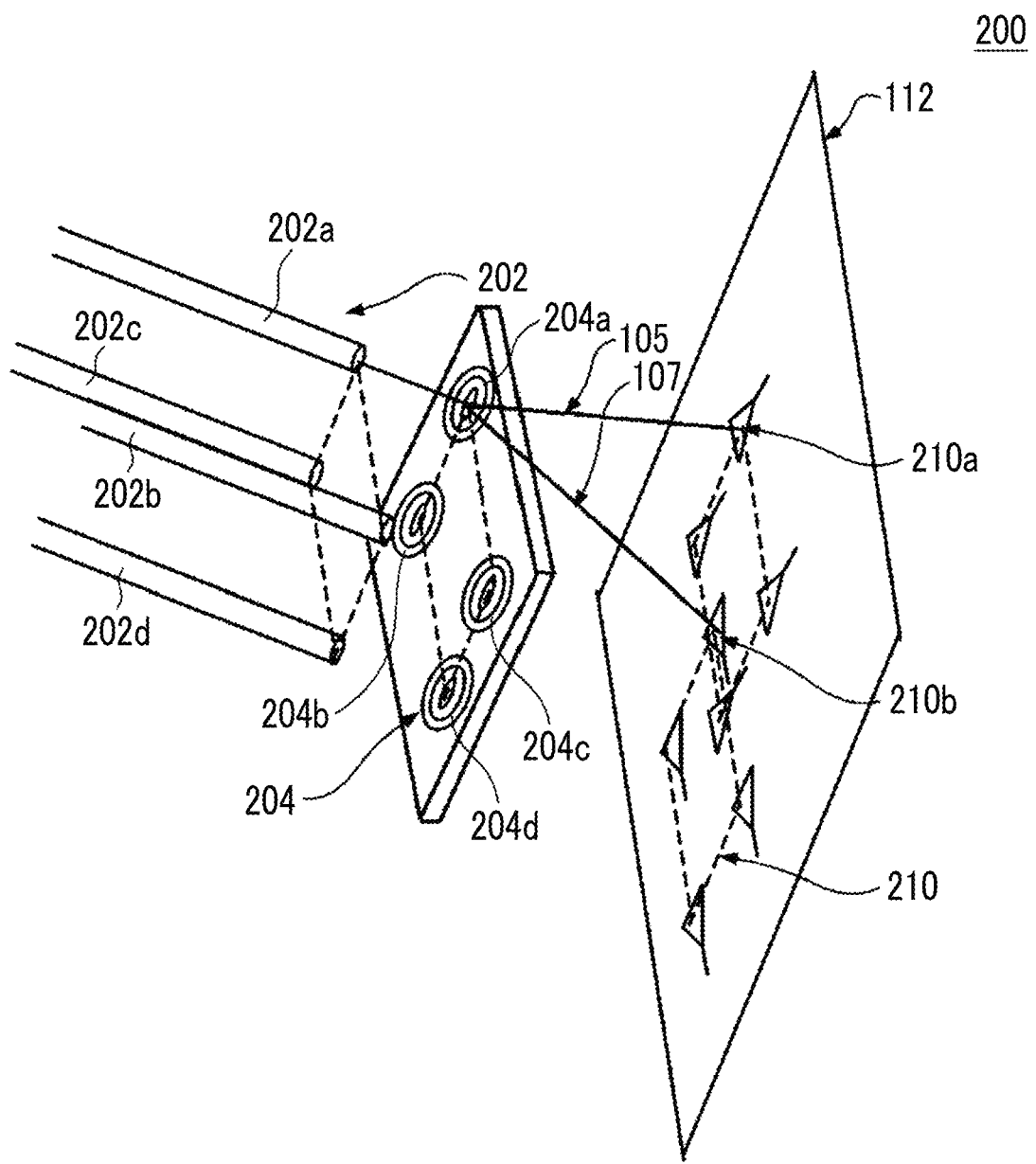
FIG. 2 is a conceptual diagram of another example of an optical coupling system of the present invention.

An example of such an optical coupling system is conceptually shown in FIG. 2.

To simplify the drawing and to clarify the configuration of the optical coupling system of the present invention, an optical fiber array 202 shown in FIG. 2 has four optical fibers 202a to 202d arranged in 2×2. A polarization multiplex mode includes polarized light in the X-axis direction and polarized light in the Y-axis direction similarly to the above.

An optical coupling system 200 shown in FIG. 2 has a liquid crystal optical element array 204 in which four liquid crystal optical elements 204a to 204d are held, for example, on a transparent substrate corresponding to the four optical fibers 202a to 202d of the optical fiber array 202. Signal light emitted from the optical fiber 202a is incident into the liquid crystal optical element 204a, signal light emitted from the optical fiber 202b is incident into the liquid crystal optical element 204b, signal light emitted from the optical fiber 202c is incident into the liquid crystal optical element 204c, and signal light emitted from the optical fiber 202d is incident into the liquid crystal optical element 204d.

In FIG. 2, a broken line 210 is a virtual line made of end surfaces of the four optical fibers and is given to assist in understanding an optical fiber to which each liquid crystal optical element in the liquid crystal optical element array 204 and the grating coupler of each photonic chip provided in the photonic device 112 are coupled.

The photonic device 112 is provided with eight photonic chips each having the grating coupler corresponding to the four optical fibers. Accordingly, eight grating couplers in total are mounted in the photonic device 112 and are coupled to the optical fibers.

For example, the signal light emitted from the optical fiber 202a is incident into the liquid crystal optical element 204a and is separated into signal light 105 and signal light 107 depending on polarization. The signal light 105 and the signal light 107 separated by the liquid crystal optical element 204a travels in different directions, the signal light 105 is incident into a grating coupler 210a of the corresponding photonic chip, and the signal light 107 is incident into a grating coupler 210b of the corresponding photonic chip.

As described above, the signal light incident into the grating coupler is converted from signal light into an electrical signal by the photoelectric conversion element (not shown) disposed ahead of the layout axis.

Figure 3:
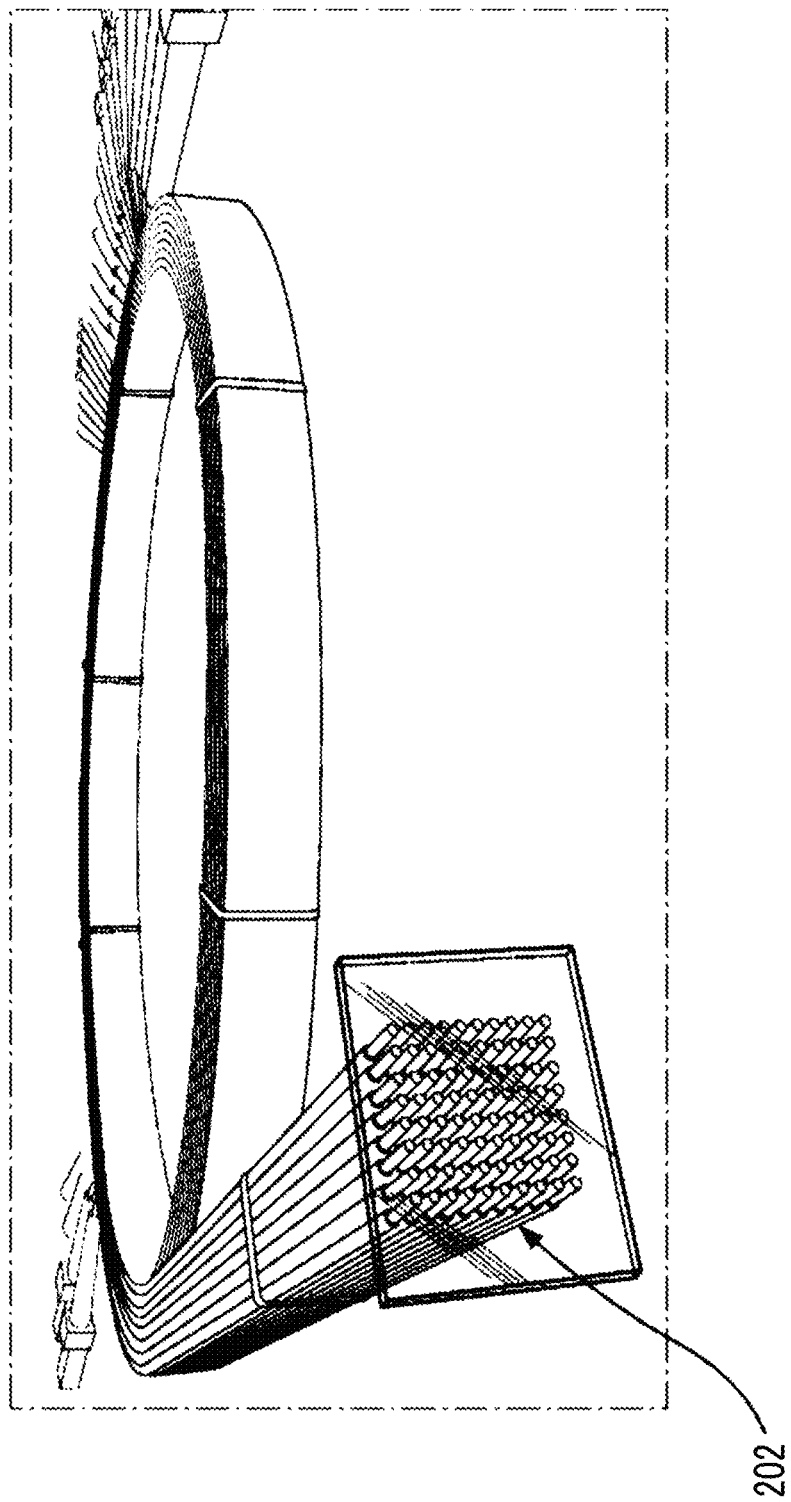
FIG. 3 is a conceptual diagram of an example of an optical fiber array that is combined with the optical coupling system of the present invention.

FIG. 3 is an example of an optical fiber array that can be used with the optical coupling system.

As conceptually shown in FIG. 3, the optical coupling system of the present invention actually mainly deals with the optical fiber array 202 configured with many optical fibers.

It can be said that the optical fiber array 202 shown in FIG. 3 is an extended system of the arrangement of the 2×2 optical fibers shown in FIG. 2. Accordingly, it can be easily understood referring to the conceptual diagrams of FIGS. 1 and 2 that the present invention can provide an optical coupling system that can be applied to the optical fiber array 202 having a large number of optical fibers.

That is, as shown in FIGS. 1 and 2, a liquid crystal optical element array having a liquid crystal optical element corresponding to each optical fiber is provided even for the optical fiber array 202 having many optical fibers, and the photonic device having the photonic chip (grating coupler) corresponding to the optical signal separated by each liquid crystal optical element. With this, it is possible to configure the optical coupling system that couples each optical fiber of the optical fiber array 202 and (each photonic chip of) the photonic device.

Figure 4:
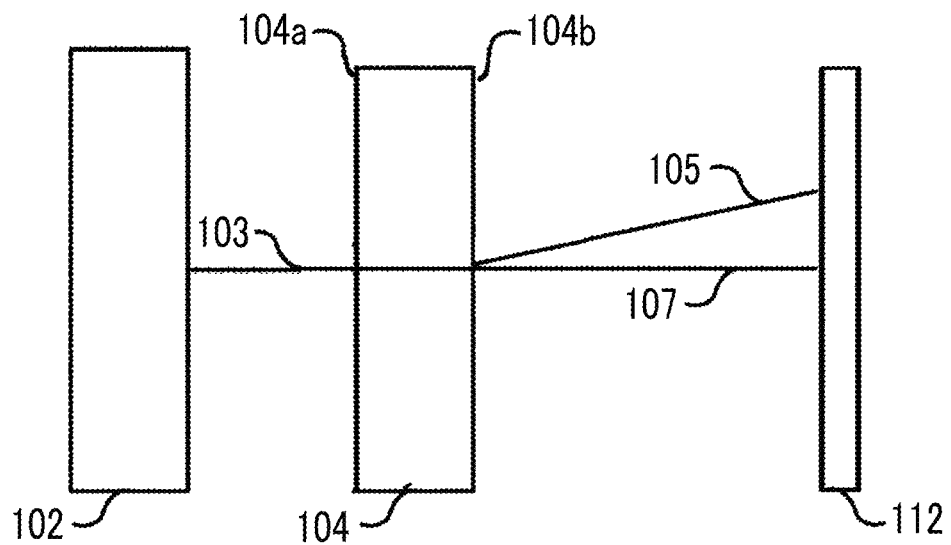
FIG. 4 is a conceptual diagram of an example of the optical coupling system of the present invention using a transmissive liquid crystal optical element.

As the liquid crystal optical element that is used in the present invention, as shown in FIGS. 1 and 4, a transmissive liquid crystal optical element that emits the signal light 103 incident into a first main surface 104a facing the optical fiber 102 from a second main surface 104b different from the first main surface to spatially separate the signal light 103 into the signal light 105 and the signal light 107 and makes the signal light 105 and the signal light 107 be incident into the grating couplers 110a and 110b of the photonic device 112 can be used.

Such a transmissive liquid crystal optical element is used in place of parts used hitherto, that is, an optically anisotropic liquid crystal material and a microlens array. For example, the transmissive liquid crystal optical element is used for the purpose of considerably reducing a mounting space, whereby it is possible to achieve small-sized mounting and arrangement without largely changing the geometry of the device.

Figure 5:
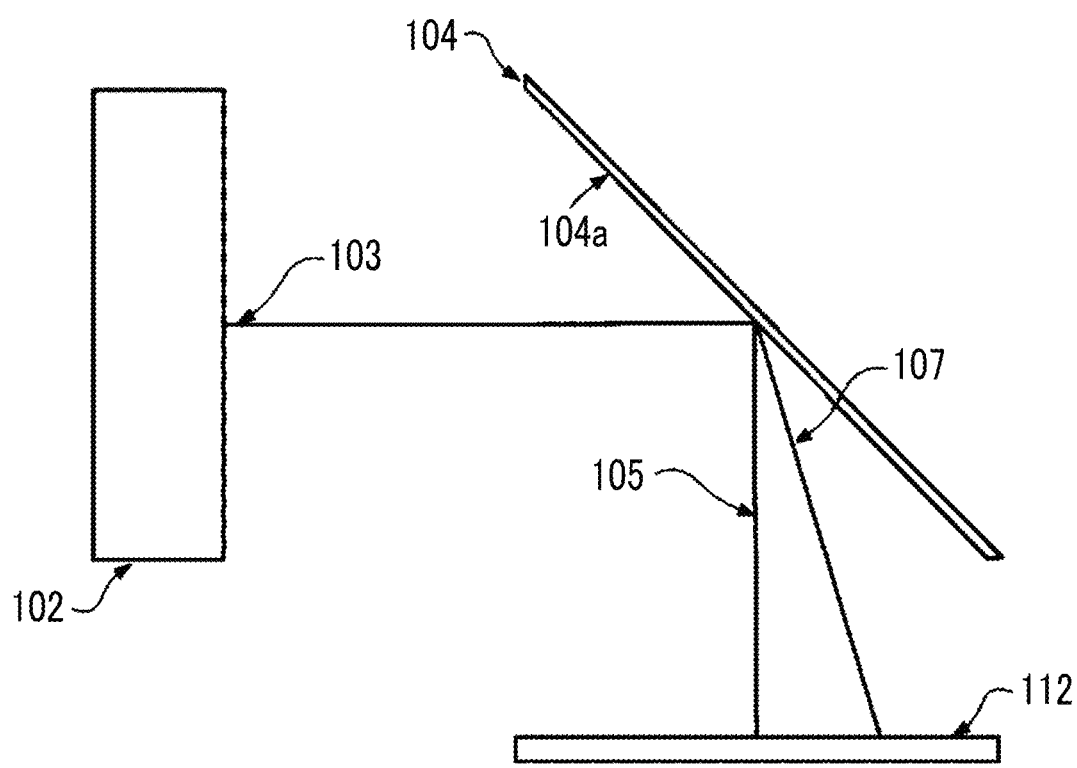
FIG. 5 is a conceptual diagram of an example of the optical coupling system of the present invention using a reflective liquid crystal optical element.

As the liquid crystal optical element that is used in the present invention, as shown in FIG. 5, a reflective optical element that reflects signal light 103 incident into a first main surface 104a facing an optical fiber 102 and emits the signal light 103 from the same first main surface 104a to spatially separate the signal light 103 into signal light 105 and signal light 107, and makes the signal light 105 and the signal light 107 be incident into the grating couplers 110a and 110b of the photonic device 112 can also be used.

Such a reflective liquid crystal optical element enables mounting and arrangement that cannot be performed with the above-described parts of the related art and a polarization beam splitter that separates light into two luminous fluxes spatially perpendicular to each other.

As the liquid crystal optical element that is used in the present invention, a liquid crystal optical element that includes an optical functional layer having a liquid crystal alignment pattern in which an optical axis derived from a liquid crystal compound changes in a plane can be used. Examples of such a liquid crystal optical element include a transmissive liquid crystal optical element shown in FIG. 2 of JP2017-522601A and a reflective liquid crystal optical element shown in FIG. 4 of JP2017-522601A.

Such a liquid crystal optical element includes an optical functional layer in which a liquid crystal compound (a compound containing mesogen) is immobilized in a predetermined alignment state and that functions as a beam displacer, and can be formed in a sheet shape. In the liquid crystal optical element, a retardation layer, a prism layer, and a microlens layer can be further combined.

The optical coupling system of the present invention can be reduced in size compared to a known optical coupling system since a layer that exhibits an optical function is extremely thin compared to a case where a beam displacer formed of an inorganic material known hitherto is used. This is extremely advantageous in terms of mounting in a device having an optical coupling system, such as an optical communication system.

The liquid crystal optical element (optical functional layer) that has the liquid crystal alignment pattern with the change in the plane can be obtained by immobilizing the liquid crystal compound in a predetermined alignment state.

The alignment state may be immobilized using an electric field, a magnetic field, or the like or may be immobilized using phase transition, crosslinking, polymerization, or the like of the liquid crystal compound.

In a case where an electric field, a magnetic field, or the like is used in the immobilization of the alignment state, switching of on/off and spatial separation of each beam may be adjusted by controlling an applied electric field or magnetic field. In a case where phase transition, crosslinking, or polymerization of the liquid crystal compound is used in the immobilization of the alignment state, various compounds that exhibit liquid crystallinity can be used as the liquid crystal compound. As the liquid crystal compound, it is preferable that a polymerizable liquid crystal compound is used from a viewpoint of maintaining a stable optical characteristic over a long period. Particularly preferably, the liquid crystal optical element that is used in the present invention is an element in which a composition containing a polymerizable liquid crystal compound is brought into a predetermined alignment state and the alignment state is immobilized by polymerization or crosslinking. Such elements can be produced using a method described in JP2017-522601A and WO2019/189852A.

Figure 6:
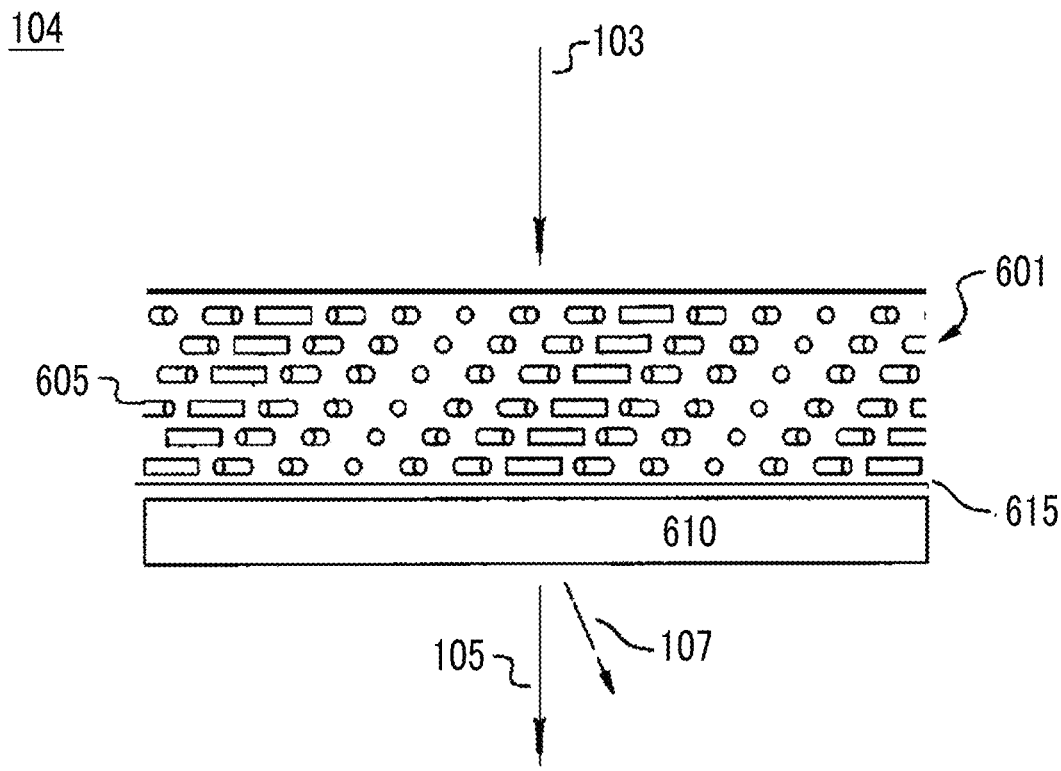
FIG. 6 is a conceptual diagram of an example of a liquid crystal optical element that is used in the present invention.

FIG. 6 is a conceptual diagram of a liquid crystal optical element that has a liquid crystal alignment pattern in which an optical axis of a liquid crystal compound changes in a plane and in which an alignment state is immobilized.

In a liquid crystal optical element 104 shown in FIG. 6, an optically anisotropic layer 601 as an optical functional layer is provided on a transparent substrate 610 that is provided as necessary. The optically anisotropic layer 601 contains a liquid crystal compound 605 in which an alignment state is immobilized on an optical axis (a major axis direction of a rod in FIG. 6) that changes in any plane 615 crossing the optically anisotropic layer 601.

The arrangement of the liquid crystal compounds 605 with the immobilized alignment forms a distribution of refractive index anisotropy in the optically anisotropic layer 601, exhibits a polarization-selective diffraction action with respect to the signal light 103 from the optical fiber, and spatially separates the incident signal light 103 into signal light 105 as 0-order light and signal light 107 as 1-order light.

Typically, in the liquid crystal optical element 104 of FIG. 6, an optical functional layer separates the incident signal light 103 into two circularly polarized light components having different rotation directions; however, in a case where the polarization multiplex mode is a multiplex mode of linearly polarized light components perpendicular to each other, an incidence-side $\lambda/4$ wavelength plate and an emission-side $\lambda/4$ wavelength plate (not shown) are added, whereby two multiplexed linearly polarized light components can be spatially separated and extracted. The same also applies to an example shown in FIG. 9 described below.

An alignment state, a polarization state, and a method in a case where 0-order light and 1-order light (alternatively, 1-order light may be used) are spatially separated can be analyzed by the Jones procedure described in JP2004-341024A (R. C. Jones, J. Opt. Soc. Am. 31, 488, 1941).

In the transmissive liquid crystal optical element 104 shown in FIG. 6, the action of separating the signal light 103 into the signal light 105 and the signal light 107 and emitting the signal light 105 and the signal light 107 in different directions is basically the same as in a transmissive liquid crystal optical element 104 shown in FIG. 9 described below.

Figure 9:
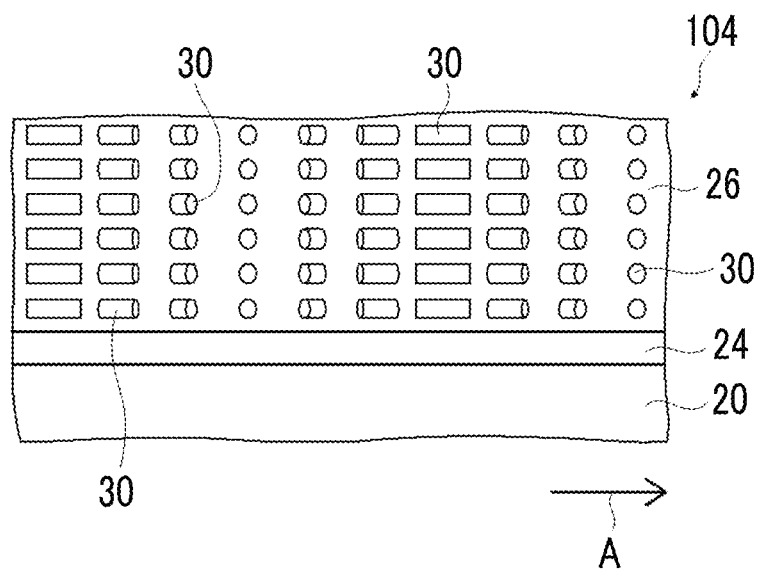
FIG. 9 is a conceptual diagram of an example of a liquid crystal optical element that is used in the optical coupling system of the present invention.

FIG. 9 conceptually shows a layer configuration of another example of the transmissive liquid crystal optical element 104.

As an example, the liquid crystal optical element 104 shown in FIG. 9 has a support 20, an alignment film 24, and an optically anisotropic layer 26. In the liquid crystal optical element 104, the optically anisotropic layer 26 is formed of a composition containing a liquid crystal compound and has a liquid crystal alignment pattern in which an orientation of an optical axis derived from the liquid crystal compound changes while continuously rotating toward at least one in-plane direction.

In the optical coupling system of the present invention, the layer configuration of the liquid crystal optical element is not limited thereto. That is, the liquid crystal optical element may be configured with the alignment film 24 and the optically anisotropic layer 26 while the support 20 is peeled off from the liquid crystal optical element 104 shown in FIG. 9. Alternatively, the liquid crystal optical element may be configured with only the optically anisotropic layer 26 while the support 20 and the alignment film 24 are peeled off from the liquid crystal optical element 104 shown in FIG. 9. In addition, the liquid crystal optical element may be configured by bonding a sheet-shaped material, such as another substrate, to the optically anisotropic layer 26.

That is, various layer configurations can be used as long as the transmissive liquid crystal optical element having the optically anisotropic layer that is used in the optical coupling system of the present invention has the liquid crystal alignment pattern in which the orientation of the optical axis derived from the liquid crystal compound changes while continuously rotating toward at least one in-plane direction.

The same also applies to a reflective liquid crystal optical element described below.

Support

In the liquid crystal optical element 104, a support 20 supports the alignment film 24 and the optically anisotropic layer 26.

As the support 20, various sheet-shaped materials (film or plate-shaped materials) can be used as long as the alignment film 24 and the optically anisotropic layer 26 can be supported.

The support 20 is preferably a transparent support, and examples of the support 20 include a polyacrylic resin film, such as polymethyl methacrylate, a cellulose resin film, such as cellulose triacetate, a cycloolefin polymer film (for example, product name "ARTON", manufactured by JSR Corporation, and product name "ZEONOR", manufactured by Zeon Corporation), polyethylene terephthalate (PET), polycarbonate, and polyvinyl chloride. The support is not limited to a flexible film and may be a non-flexible substrate, such as a glass substrate.

A thickness of the support 20 is not limited and may be appropriately set depending on the purpose of the liquid crystal optical element 104, the material for forming the support 20, and the like in a range where the alignment film and the optically anisotropic layer can be held.

The thickness of the support 20 is preferably 1 to 1000 μm, more preferably 3 to 250 and still more preferably 5 to 150 μm.

Alignment Film

In the liquid crystal optical element 104, the alignment film 24 is formed on a surface of the support 20.

The alignment film 24 is an alignment film for aligning the liquid crystal compound 30 to a predetermined liquid crystal alignment pattern in a case of forming the optically anisotropic layer 26 of the liquid crystal optical element 104.

In FIG. 9 and the like, a rod-like liquid crystal compound is shown as the liquid crystal compound 30.

As described above, in the transmissive liquid crystal optical element 104 of the example shown in the drawing, the optically anisotropic layer 26 has a liquid crystal alignment pattern in which the orientation of an optical axis 30A (see FIG. 10) derived from the liquid crystal compound 30 changes while continuously rotating along one in-plane direction (an arrow A direction in the drawing).

Accordingly, the alignment film of the liquid crystal optical element 104 is formed such that the optically anisotropic layer 26 can form the liquid crystal alignment pattern.

In the present invention, in a case where the liquid crystal compound 30 is a rod-like liquid crystal compound, the optical axis 30A of the liquid crystal compound 30 intends a molecular major axis of the rod-like liquid crystal compound. On the other hand, in a case where the liquid crystal compound 30 is a disc-like liquid crystal compound, the optical axis 30A of the liquid crystal compound 30 intends an axis parallel to a normal direction normal (a perpendicular direction) with respect to a disc plane of the disc-like liquid crystal compound.

In the following description, "the orientation of the optical axis 30A rotates" will also be simply referred to as "the optical axis 30A rotates".

As the alignment film, various known alignment films can be used.

Examples of the alignment film include a rubbed film formed of an organic compound, such as a polymer, an obliquely deposited film formed of an inorganic compound, a film having a microgroove, and a film formed by lamination of Langmuir-Blodgett (LB) films formed with a Langmuir-Blodgett's method using an organic compound, such as ω-tricosanoic acid, dioctadecylmethylammonium chloride, or methyl stearate.

The alignment film formed by rubbing treatment can be formed by rubbing a surface of a polymer layer with paper or fabric in a given direction several times.

Preferable examples of the material used for the alignment film include polyimide, polyvinyl alcohol, a polymer having a polymerizable group described in JP1997-152509A (JP-H9-152509A), and a material used for forming the alignment film and the like described in JP2005-097377A, JP2005-099228A, and JP2005-128503A.

In the liquid crystal optical element 104, the alignment film is suitably used as a so-called photo-alignment film obtained by irradiating a photo-alignment material with polarized light or non-polarized light. That is, in the liquid crystal optical element 104, a photo-alignment film that is formed by applying a photo-alignment material to the support 20 is suitably used as the alignment film 24.

The irradiation of polarized light can be performed in a direction perpendicular or oblique to the photo-alignment film, and the irradiation of non-polarized light can be performed in a direction oblique to the photo-alignment film.

Preferable examples of the photo-alignment material used for the photo-alignment film that can be used in the present invention include an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B, an aromatic ester compound described in JP2002-229039A, a maleimide and/or alkenyl-substituted nadiimide compound having a photo-alignment unit described in JP2002-265541A and JP2002-317013A, a photocrosslinking silane derivative described in JP4205195B and JP4205198B, photocrosslinking polyimide, photocrosslinking polyamide, and photocrosslinking ester described in JP2003-520878A, JP2004-529220A, and JP4162850B, and a photodimerizable compound, in particular, a cinnamate compound, a chalcone compound, and a coumarin compound described in JP1997-118717A (JP-H9-

118717A), JP1998-506420A (JP-H10-506420A), JP2003-505561A, WO2010/150748A, JP2013-177561A, and JP2014-012823A.

Among these, an azo compound, photocrosslinking polyimide, photocrosslinking polyamide, photocrosslinking ester, a cinnamate compound, and a chalcone compound are preferably used.

A thickness of the alignment film is not limited and may be appropriately set depending on the material for forming the alignment film in a range where required alignment performance is obtained.

The thickness of the alignment film is preferably 0.01 to 5 μm, and more preferably 0.05 to 2 μm.

A method of forming the alignment film is not limited, and various known methods depending on the material for forming the alignment film can be used. As an example, a method of applying the alignment film to the surface of the support 20, drying the alignment film, and then, exposing the alignment film to laser light to form an alignment pattern is used.

Figure 13:
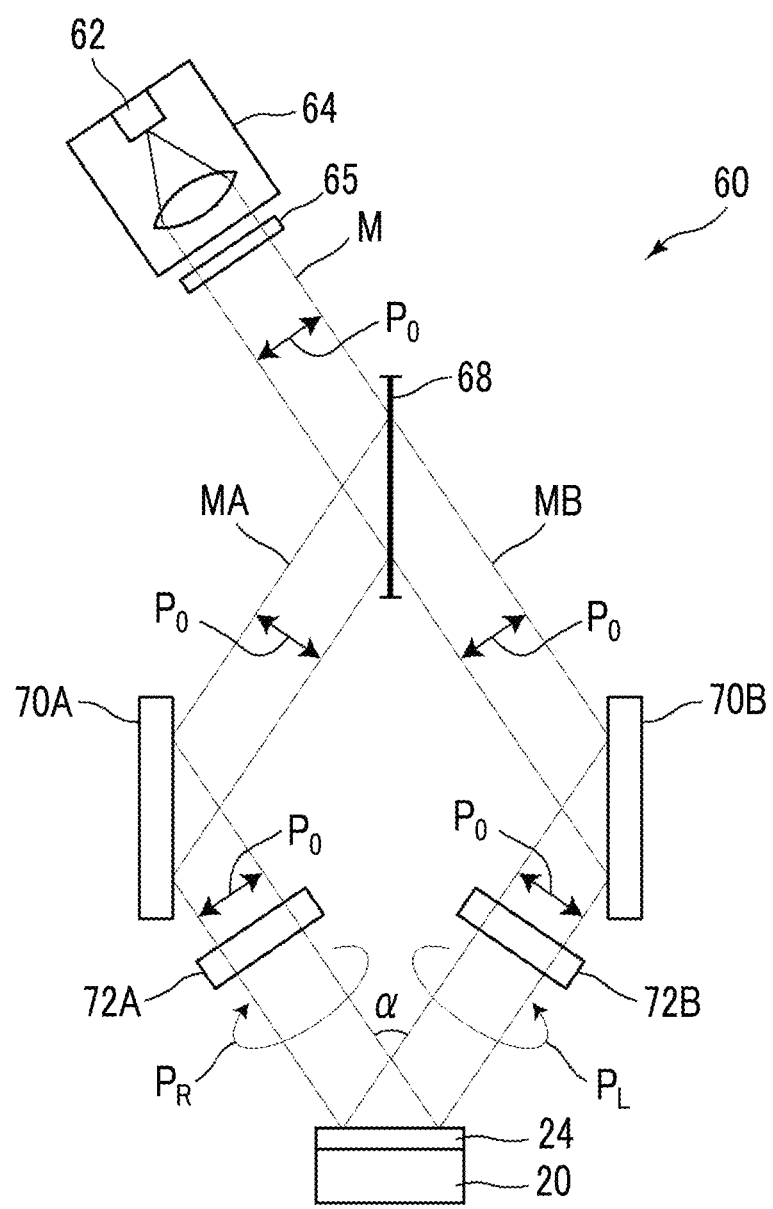
FIG. 13 is a conceptual diagram of an example of an exposure device that exposes an alignment film of the liquid crystal optical element shown in FIG. 9.

FIG. 13 conceptually shows an example of an exposure device that exposes the alignment film 24 to form the above-described alignment pattern.

An exposure device 60 shown in FIG. 13 comprises a light source 64 that comprises a laser 62, a λ/2 plate 65 that changes a polarization direction of laser light M emitted from the laser 62, a polarization beam splitter 68 that separates the laser light M emitted from the laser 62 into two rays of a ray MA and a ray MB, and mirrors 70A and 70B and λ/4 plates 72A and 72B disposed on optical paths of the two separated rays MA and MB.

The light source 64 emits linearly polarized light $P_0$. The λ/4 plate 72A converts the linearly polarized light $P_0$ (ray MA) into right circularly polarized light $P_R$, and the λ/4 plate 72B converts the linearly polarized light $P_0$ (ray MB) into left circularly polarized light $P_L$.

The support 20 having the alignment film 24 before the alignment pattern is formed is disposed in an exposed portion, the two rays MA and MB intersect and interfere with each other on the alignment film 24, and the alignment film 24 is irradiated with and exposed to the interference light.

Due to the interference in this case, a polarization state of light with which the alignment film 24 is irradiated periodically changes according to interference fringes. With this, an alignment film having an alignment pattern in which the alignment state periodically changes is obtained. In the following description, the alignment film having the alignment pattern in which the alignment state periodically changes is also referred to as a patterned alignment film.

In the exposure device 60, the period of the alignment film can be adjusted by changing an intersecting angle α of the two rays MA and MB. That is, in the exposure device 60, in the alignment pattern in which the optical axis 30A derived from the liquid crystal compound 30 continuously rotates along one direction, a length of a single period (single period Λ) over which the optical axis 30A rotates by 180° in one direction in which the optical axis 30A rotates can be adjusted by adjusting the intersecting angle α.

The optically anisotropic layer 26 is formed on the alignment film 24 having the alignment pattern in which the alignment state periodically changes, whereby it is possible to form the optically anisotropic layer 26 having the liquid crystal alignment pattern, in which the optical axis 30A derived from the liquid crystal compound 30 continuously rotates along one direction, described below.

The rotation direction of the optical axis 30A can be reversed by rotating each of the optical axes of the λ/4 plates 72A and 72B by 90°.

As described above, the patterned alignment film has the alignment pattern in which the liquid crystal compound is aligned to be the liquid crystal alignment pattern in which the orientation of the optical axis of the liquid crystal compound of the optically anisotropic layer 26 formed on the patterned alignment film changes while continuously rotating along at least one in-plane direction.

In a case where an axis along an orientation in which the patterned alignment film aligns the liquid crystal compound is defined as an alignment axis, it can be said that the patterned alignment film has the alignment pattern in which the orientation of the alignment axis changes while continuously rotating along at least one in-plane direction.

The alignment axis of the patterned alignment film can be detected by measuring absorption anisotropy. For example, in a case where the patterned alignment film is irradiated with linearly polarized light while rotating the patterned alignment film to measure an amount of light transmitted through the patterned alignment film, it is observed that an orientation in which the amount of light is the maximum or the minimum gradually changes in one in-plane direction.

In the liquid crystal optical element 104, the alignment film 24 is provided as a preferred aspect and is not an essential constituent element as described above.

For example, a configuration can be made in which, by forming an alignment pattern on the support 20 using a method of rubbing the support 20, a method of processing the support 20 with laser light or the like, the optically anisotropic layer 26 or the like has the liquid crystal alignment pattern in which the orientation of the optical axis 30A derived from the liquid crystal compound 30 changes while continuously rotating along one direction.

Optically Anisotropic Layer

In the liquid crystal optical element 104 shown in FIG. 9, the optically anisotropic layer 26 is formed on a surface of the alignment film 24.

As described above, in the liquid crystal optical element 104, the optically anisotropic layer 26 is formed of the composition containing the liquid crystal compound.

In a case where a value of in-plane retardation is set to λ/2, the optically anisotropic layer 26 has a function as a general λ/2 plate, that is, a function of giving a half wavelength, that is, 180° to two linearly polarized light components perpendicular to each other included in light incident into the optically anisotropic layer.

The optically anisotropic layer 26 has the liquid crystal alignment pattern in which the orientation of the optical axis 30A derived from the liquid crystal compound 30 changes while continuously rotating in one direction (the arrow A direction of FIG. 10 or the like) in the plane of the optically anisotropic layer.

The optical axis 30A derived from the liquid crystal compound 30 is an axis having a highest refractive index in the liquid crystal compound 30, that is, a so-called slow axis. For example, in a case where the liquid crystal compound 30 is a rod-like liquid crystal compound, the optical axis 30A is along a major axis direction of a rod shape.

In the following description, the optical axis 30A derived from the liquid crystal compound 30 will also be referred to as "the optical axis 30A of the liquid crystal compound 30" or "the optical axis 30A".

Figure 10:
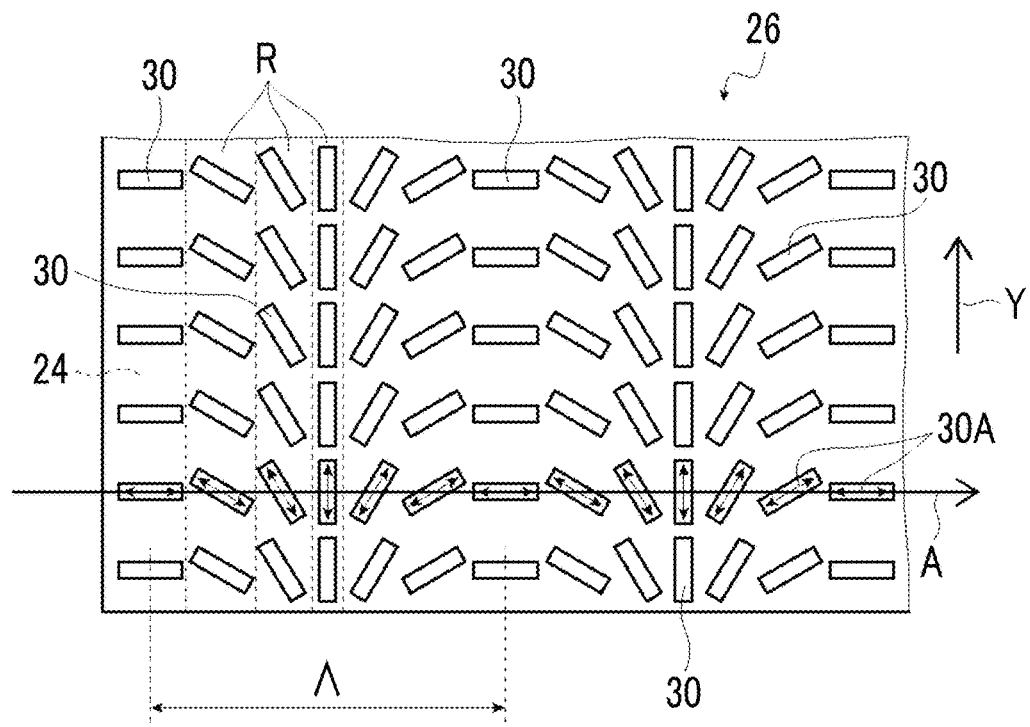
FIG. 10 is a conceptual diagram of a plane of the liquid crystal optical element shown in FIG. 9.

FIG. 10 is a schematic view showing the alignment state of the liquid crystal compound 30 in a plane of a main surface of the optically anisotropic layer 26. The main surface is a largest surface of a sheet-shaped material (film, plate-shaped material, or layer).

As described above, the optically anisotropic layer 26 has the liquid crystal alignment pattern in which the optical axis 30A changes while continuously rotating in one direction indicated by an arrow A in a plane.

Figure 11:
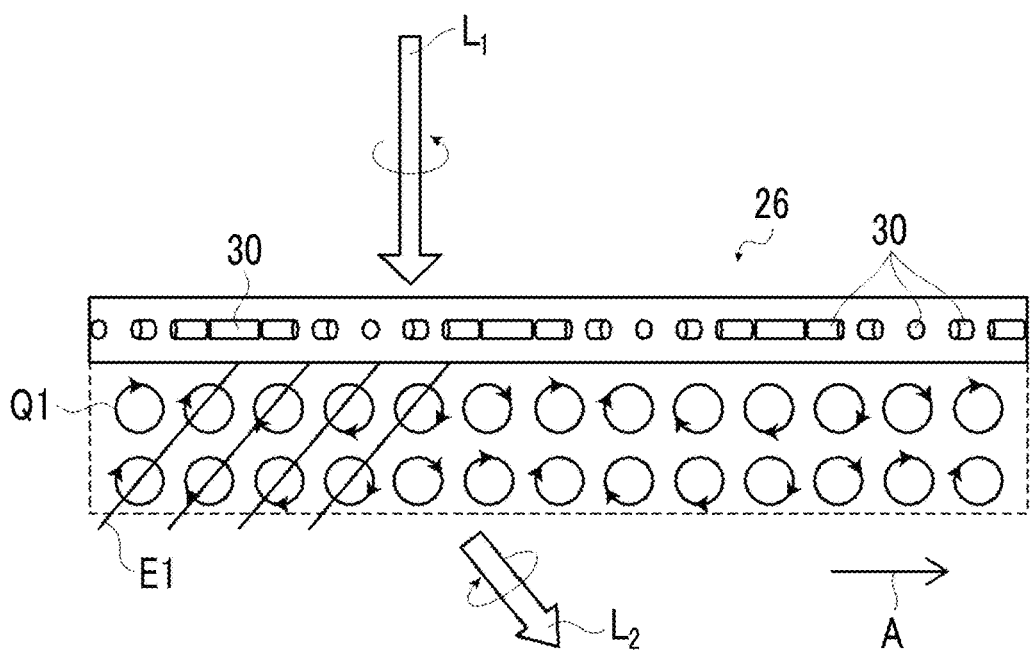
FIG. 11 is a conceptual diagram illustrating the action of the liquid crystal optical element shown in FIG. 9.
Figure 12:
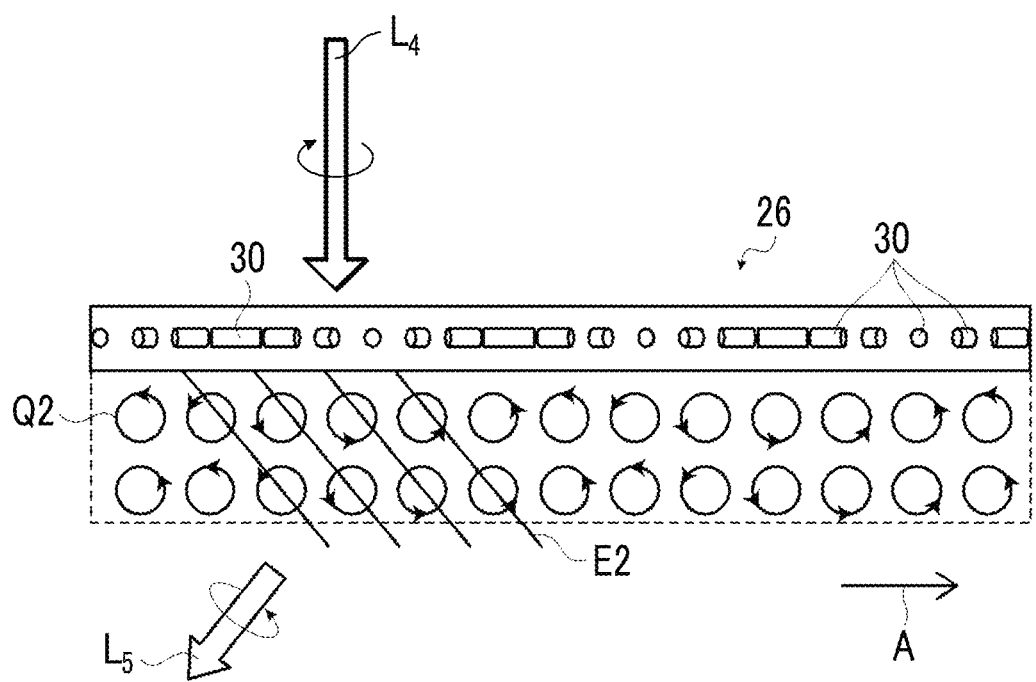
FIG. 12 is a conceptual diagram illustrating the action of the liquid crystal optical element shown in FIG. 9.

In the optically anisotropic layer 26, the liquid crystal compound 30 is arranged in a two-dimensional manner in a plane parallel to one direction indicated by the arrow A and the Y direction perpendicular to the arrow A direction. In FIGS. 11 and 12 described below, the Y direction is a direction perpendicular to the paper plane.

In the following description, "one direction indicated by the arrow A" will also be simply referred to as "arrow A direction".

The plan view is a diagram in a case where the optically anisotropic layer 26 is viewed from a thickness direction (=a laminating direction of each layer (film)). In other words, the plan view is a view in a case where the optically anisotropic layer 26 is viewed from a direction perpendicular to the main surface.

In FIG. 10, to clarify the configuration of the liquid crystal optical element 104, only the liquid crystal compound 30 on the surface of the alignment film 24 is shown. Note that, as shown in FIG. 9, the optically anisotropic layer 26 also has a structure in which the liquid crystal compound 30 is laminated in a thickness direction from the liquid crystal compound 30 on the surface of the alignment film. The same also applies to FIGS. 11, 12, and 15 described below.

The optically anisotropic layer 26 has the liquid crystal alignment pattern in which the orientation of the optical axis 30A derived from the liquid crystal compound 30 changes while continuously rotating along the arrow A direction in a plane of the optically anisotropic layer 26.

Specifically, "the orientation of the optical axis 30A of the liquid crystal compound 30 changes while continuously rotating in the arrow A direction (predetermined one direction)" means that an angle between the optical axis 30A of each of the liquid crystal compounds 30 arranged in the arrow A direction and the arrow A direction varies depending on a position of the arrow A direction, and an angle between the optical axis 30A and the arrow A direction sequentially changes from θ to θ+180° or θ−180° along the arrow A direction.

A difference between the angles of the optical axes 30A of the liquid crystal compound 30 adjacent to each other in the arrow A direction is preferably equal to or less than 45°, more preferably equal to or less than 15°, and still more preferably less than 15°.

On the other hand, in regard to the liquid crystal compound 30 for forming the optically anisotropic layer 26, the liquid crystal compounds 30 having the same orientation of the optical axis 30A are arranged at regular intervals in the Y direction perpendicular to the arrow A direction, that is, the Y direction perpendicular to one direction in which the optical axis 30A continuously rotates.

In other words, in the liquid crystal compounds 30 that form the optically anisotropic layer 26, the angle between the orientation of the optical axis 30A and the arrow A direction is the same in the liquid crystal compounds 30 arranged in the Y direction.

In the liquid crystal alignment pattern in which the optical axis 30A continuously rotates toward one direction, the length (distance) over which the optical axis 30A of the liquid crystal compound 30 rotates by 180° is set as the length Λ of the single period in the liquid crystal alignment pattern.

That is, in a case of the optically anisotropic layer 26 shown in FIGS. 9 and 10, the length (distance) over which the optical axis 30A of the liquid crystal compound 30 rotates by 180° in the arrow A direction in which the orientation of the optical axis 30A changes while continuously rotating in a plane is set as the length Λ of the single period in the liquid crystal alignment pattern. In other words, the length of the single period in the liquid crystal alignment pattern is defined by a distance between θ to θ+180° that is a range of the angle between the optical axis 30A of the liquid crystal compound 30 and the arrow A direction.

That is, a distance between centers in the arrow A direction of two liquid crystal compounds 30 having the same angle with respect to the arrow A direction is set as the length Λ of the single period. Specifically, as shown in FIG. 10, a distance between centers in the arrow A direction of two liquid crystal compounds 30 in which the arrow A direction matches the optical axis 30A is set as the length Λ of the single period.

In the following description, the length Λ of the single period will also be referred to as "single period Λ".

In the liquid crystal optical element 104, the liquid crystal alignment pattern of the optically anisotropic layer 26 repeats the single period Λ in the arrow A direction, that is, one direction in which the orientation of the optical axis 30A changes while continuously rotating. The liquid crystal optical element 104 (optically anisotropic layer 26) is a liquid crystal diffraction element, and the single period Λ is a period (single period) of a diffraction structure.

As described above, in the optically anisotropic layer 26, the angle between the optical axis 30A and the arrow A direction, that is, one direction in which the orientation of the optical axis of the liquid crystal compound 30 rotates is the same in the liquid crystal compounds arranged in the Y direction perpendicular to the arrow A direction. Regions where the liquid crystal compounds 30 in which the angle between the optical axis 30A and the arrow A direction is the same are disposed in the Y direction are referred to as regions R.

In this case, it is preferable that a value of in-plane retardation (Re) in each region R is a half wavelength, that is, λ/2. The in-plane retardation is calculated by a product of a difference Δn in refractive index generated by refractive index anisotropy of the region R and the thickness of the optically anisotropic layer. Here, the difference in refractive index generated by refractive index anisotropy of the region R in the optically anisotropic layer is a difference in refractive index that is defined by a difference between a refractive index of a direction of an in-plane slow axis of the region R and a refractive index of a direction perpendicular to the direction of the slow axis. That is, the difference Δn in refractive index generated by refractive index anisotropy of the region R is equal to a difference between a refractive index of the liquid crystal compound 30 in a direction of the optical axis 30A and a refractive index of the liquid crystal compound 30 in a direction perpendicular to the optical axis 30A in a plane of the region R. That is, the different Δn in refractive index is equal to the difference in refractive index of the liquid crystal compound.

In a case where circularly polarized light is incident into such an optically anisotropic layer 26, light is refracted (diffracted), and a direction of the circularly polarized light is converted.

The action is conceptually shown in FIGS. 11 and 12. In the optically anisotropic layer 26, it is assumed that a value of a product of a difference in refractive index of the liquid crystal compound and a thickness of the optically anisotropic layer is λ/2.

As shown in FIG. 11, in a case where the value of the product of the difference in refractive index of the liquid crystal compound of the optically anisotropic layer 26 and the thickness of the optically anisotropic layer is λ/2, and in a case where incident light $L_1$ that is left circularly polarized light is incident into the optically anisotropic layer 26, the incident light $L_1$ passes through the optically anisotropic layer 26 to be given a phase difference of 180°, and transmitted light $L_2$ is converted into right circularly polarized light.

In a case where the incident light $L_1$ passes through the optically anisotropic layer 26, an absolute phase of the incident light $L_1$ changes depending on the orientation of the optical axis 30A of each of the liquid crystal compounds 30. In this case, since the orientation of the optical axis 30A changes while rotating along the arrow A direction, an amount of change in absolute phase of the incident light $L_1$ varies depending on the orientation of the optical axis 30A. The liquid crystal alignment pattern formed in the optically anisotropic layer 26 is a pattern that is periodic in the arrow A direction. For this reason, as shown in FIG. 11, the incident light $L_1$ passing through the optically anisotropic layer 26 is given an absolute phase Q1 that is periodic in the arrow A direction corresponding to the orientation of each of the optical axes 30A. With this, an equiphase surface E1 that is tilted in a direction opposite to the arrow A direction is formed.

For this reason, the transmitted light $L_2$ is refracted to be tilted toward a direction perpendicular to the equiphase surface E1 and travels in a direction different from a traveling direction of the incident light $L_1$. In this way, the incident light $L_1$ of the left circularly polarized light is converted into the transmitted light $L_2$ of right circularly polarized light that is tilted by a predetermined angle in the arrow A direction with respect to an incidence direction.

On the other hand, as conceptually shown in FIG. 12, in a case where the value of the product of the difference in refractive index of the liquid crystal compound of the optically anisotropic layer 26 and the thickness of the optically anisotropic layer is λ/2, and in a case where incident light $L_4$ of right circularly polarized light is into the optically anisotropic layer 26, the incident light $L_4$ passes through the optically anisotropic layer 26 to be given a phase difference of 180° and is converted into transmitted light $L_5$ of left circularly polarized light.

In a case where the incident light $L_4$ passes through the optically anisotropic layer 26, an absolute phase of the incident light $L_4$ changes depending on the orientation of the optical axis 30A of each of the liquid crystal compounds 30. In this case, since the orientation of the optical axis 30A changes while rotating along the arrow A direction, an amount of change in absolute phase of the incident light $L_4$ varies depending on the orientation of the optical axis 30A. The liquid crystal alignment pattern formed in the optically anisotropic layer 26 is a pattern that is periodic in the arrow A direction. For this reason, as shown in FIG. 12, the incident light $L_4$ passing through the optically anisotropic layer 26 is given an absolute phase Q2 that is periodic in the arrow A direction corresponding to the orientation of each of the optical axes 30A.

Here, since the incident light $L_4$ is right circularly polarized light, the absolute phase Q2 that is periodic in the arrow A direction corresponding to the orientation of the optical axis 30A is opposite to the incident light $L_1$ that is the left circularly polarized light. As a result, in the incident light $L_4$, an equiphase surface E2 that is tilted in the arrow A direction opposite to that of the incident light $L_1$ is formed.

For this reason, the incident light $L_4$ is refracted to be tilted toward a direction perpendicular to the equiphase surface E2 and travels in a direction different from a traveling direction of the incident light $L_4$. In this way, the incident light $L_4$ is converted into transmitted light $L_5$ of left circularly polarized light that is tilted by a predetermined angle in a direction opposite to the arrow A direction with respect to an incidence direction.

Accordingly, for example, in the optical coupling system 100, in a case where the signal light 103 emitted from the optical fiber 102 is incident into the liquid crystal optical element 104, the signal light 103 is separated into two signal light components of signal light 105 and signal light 107 of a component close to right circularly polarized light and a component close to left circularly polarized light with the action of the optically anisotropic layer 26, and the signal light 105 and the signal light 107 are diffracted in separate directions.

The two signal light components travel in separate directions, as described above, the signal light 105 is incident into the grating coupler 110a of the photonic chip 112a provided in the photonic device 112, and the signal light 107 is incident into the grating coupler 110b of the photonic chip 112b provided in the photonic device 112.

In the optically anisotropic layer 26, it is preferable that the value of in-plane retardation of each of a plurality of regions R is a half wavelength. It is preferable that an in-plane retardation Re (550)=$\Delta n_{550} \times d$ of each of a plurality of regions R of the optically anisotropic layer 26 with respect to incident light having a wavelength of 550 nm is within a range defined by Expression (1) described below. Here, $\Delta n_{550}$ is a difference in refractive index generated by refractive index anisotropy of the region R in a case where the wavelength of incident light is 550 nm, and d is the thickness of the optically anisotropic layer 26.

$$200 \text{ nm} \leq \Delta n_{500} \times d \leq 350 \text{ nm} \tag{1}$$

The optically anisotropic layer 26 functions as a so-called λ/2 plate. Note that the present invention includes an aspect where, in a case where the support 20 and the alignment film 24 are provided, a laminate comprising the support 20 and the alignment film 24 integrally functions as a λ/2 plate.

The optically anisotropic layer 26 can angles of refraction of transmitted light $L_2$ and $L_5$ by changing the single period Λ of the formed liquid crystal alignment pattern. Specifically, as the single period Λ of the liquid crystal alignment pattern decreases, light components passing through the liquid crystal compounds 30 adjacent to each other more strongly interfere with each other. Therefore, the transmitted light $L_2$ and $L_5$ can be more largely refracted.

The rotation direction of the optical axis 30A of the liquid crystal compound 30 that rotates along the arrow A direction is reversed, whereby the direction of refraction of transmitted light can be revered.

Here, refraction of light by the optically anisotropic layer 26 varies depending on a wavelength of incident light. That is, angles of refraction of transmitted light $L_2$ and $L_5$ with respect to the incident light $L_1$ and $L_4$ vary depending on wavelengths of the incident light $L_1$ and $L_4$ (transmitted light $L_2$ and $L_5$).

Specifically, as the wavelength of incident light increases, transmitted light is largely refracted. That is, in a case where incident light is red light, green light, and blue light, the red light is refracted to the highest degree, and the blue light is refracted to the lowest degree.

Accordingly, with the liquid crystal optical element 104 having the optically anisotropic layer 26, light can be separated depending on a wavelength, instead of polarization, and separated light components can be refracted in different directions.

As an example, by using blue light and red light having the same polarization as the signal light 103 emitted from the optical fiber 102, the signal light 103 may be separated into, for example, signal light 105 as red light and signal light 107 as blue light by the liquid crystal optical element 104, and similarly to be above, the signal light 105 may be incident into the grating coupler 110a of the photonic chip 112a, and the signal light 107 may be incident into the grating coupler 110b of the photonic chip 112b.

The liquid crystal optical element 104 may separate the signal light using separation only by polarized components or using polarized components and wavelength components including separation by polarized components, and may refract separated signal light components in different directions.

The optically anisotropic layer 26 is formed of a liquid crystal composition containing a rod-like liquid crystal compound or a disc-like liquid crystal compound, and an optical axis of the rod-like liquid crystal compound or an optical axis of the disc-like liquid crystal compound has a liquid crystal alignment pattern aligned as described above.

The alignment film 24 having an alignment pattern corresponding to the above-described liquid crystal alignment pattern is formed on the support 20, and a liquid crystal composition is applied to the alignment film 24 and cured, whereby an optically anisotropic layer formed of a cured layer of the liquid crystal composition can be obtained.

The liquid crystal composition for forming the optically anisotropic layer 26 contains a rod-like liquid crystal compound or a disc-like liquid crystal compound, and may further contain other components, such as a leveling agent, an alignment control agent, a surfactant, a polymerization initiator, a crosslinking agent, and an alignment assistant.

It is preferable that the optically anisotropic layer 26 has a wide range with respect to the wavelength of incident light and is formed of a liquid crystal material having reverse birefringence dispersion. It is also preferable that the optically anisotropic layer is made to have a substantially wide range with respect to the wavelength of incident light by giving a twisted component to the liquid crystal composition or laminating different retardation layers. For example, in the optically anisotropic layer 26, a method of realizing a λ/2 plate having a wide-range pattern by laminating two liquid crystal layers having different twisted directions is disclosed in JP2014-089476A or the like, and can be preferably used in the present invention.

Rod-Like Liquid Crystal Compound

Preferable examples of the rod-like liquid crystal compound include an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound. As the rod-like liquid crystal compound, not only the above-described low molecular weight liquid crystal molecules but also high molecular weight liquid crystal molecules can be used.

In the optically anisotropic layer 26, it is more preferable that the alignment of the rod-like liquid crystal compound is immobilized by polymerization. Examples of polymerizable rod-like liquid crystal compound include compounds described in Makromol. Chem., Vol. 190, p. 2255 (1989), Advanced Materials, Vol. 5, p. 107 (1993), U.S. Pat. Nos. 4,683,327A, 5,622,648A, 5,770,107A, WO95/022586A, WO95/024455A, WO97/000600A, WO98/023580A, WO98/052905A, JP1989-272551A (JP-H1-272551A), JP1994-016616A (JP-H6-016616A), JP1995-110469A (JP-H7-110469A), JP1999-080081A (JP-H11-080081A), and JP2001-064627. As the rod-like liquid crystal compound, for example, compounds described in JP1999-513019A (JP-H11-513019A) and JP2007-279688A can be preferably used.

Disc-Like Liquid Crystal Compound

As the disc-like liquid crystal compound, for example, compounds described in JP2007-108732A and JP2010-244038A can be preferably used.

In a case where the disc-like liquid crystal compound is used in the optically anisotropic layer, the liquid crystal compound 30 rises in the thickness direction in the optically anisotropic layer, and the optical axis 30A derived from the liquid crystal compound is defined as an axis perpendicular to a disc plane, that is, a so-called fast axis.

A reflective liquid crystal optical element can be obtained by using the transparent substrate 610 of FIG. 6 as a reflective substrate or by designing the alignment state of the liquid crystal compound 605 in the optical functional layer using the Johns procedure described above.

Figure 14:
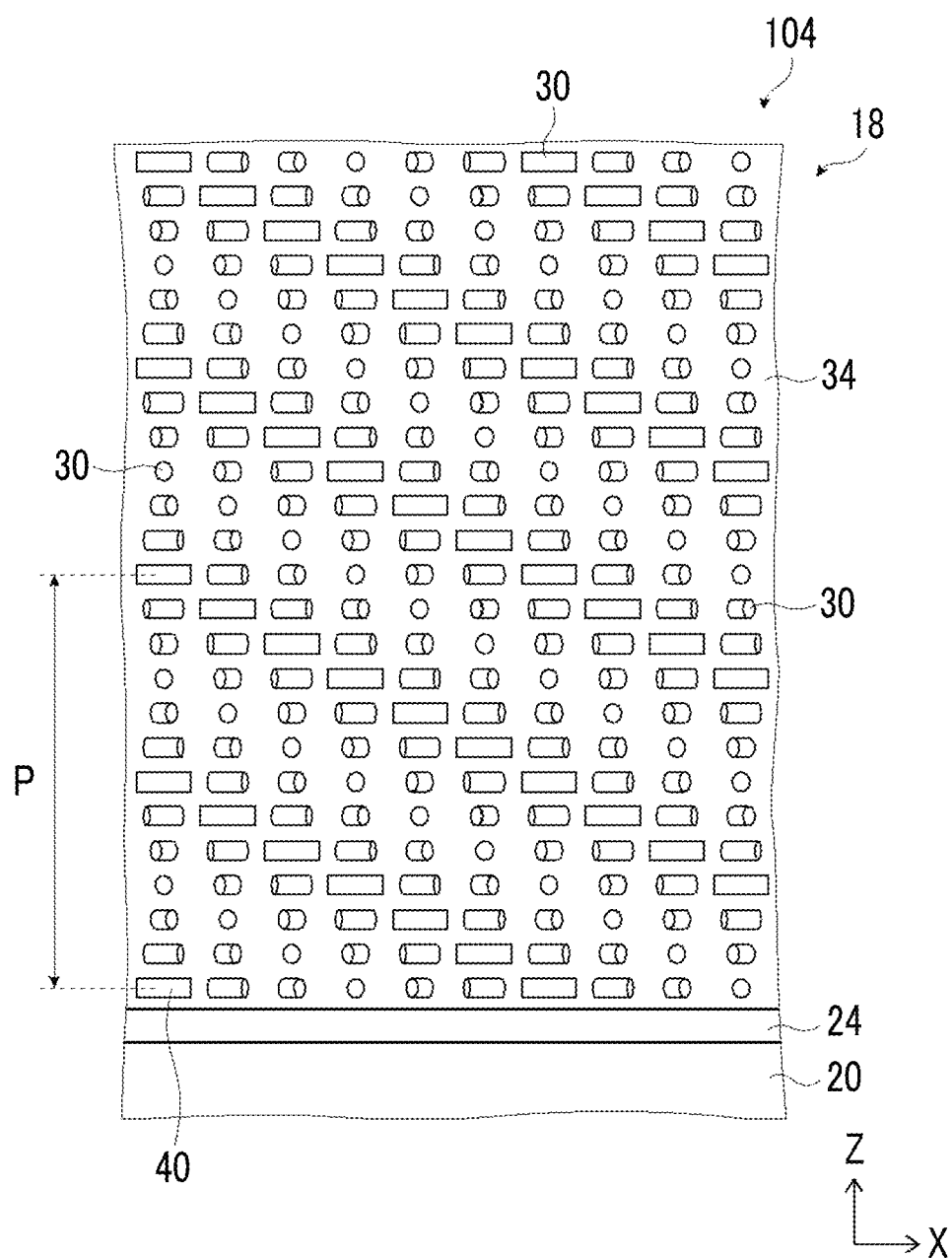
FIG. 14 is a conceptual diagram of another example of a liquid crystal optical element that is used in the optical coupling system of the present invention.
Figure 15:
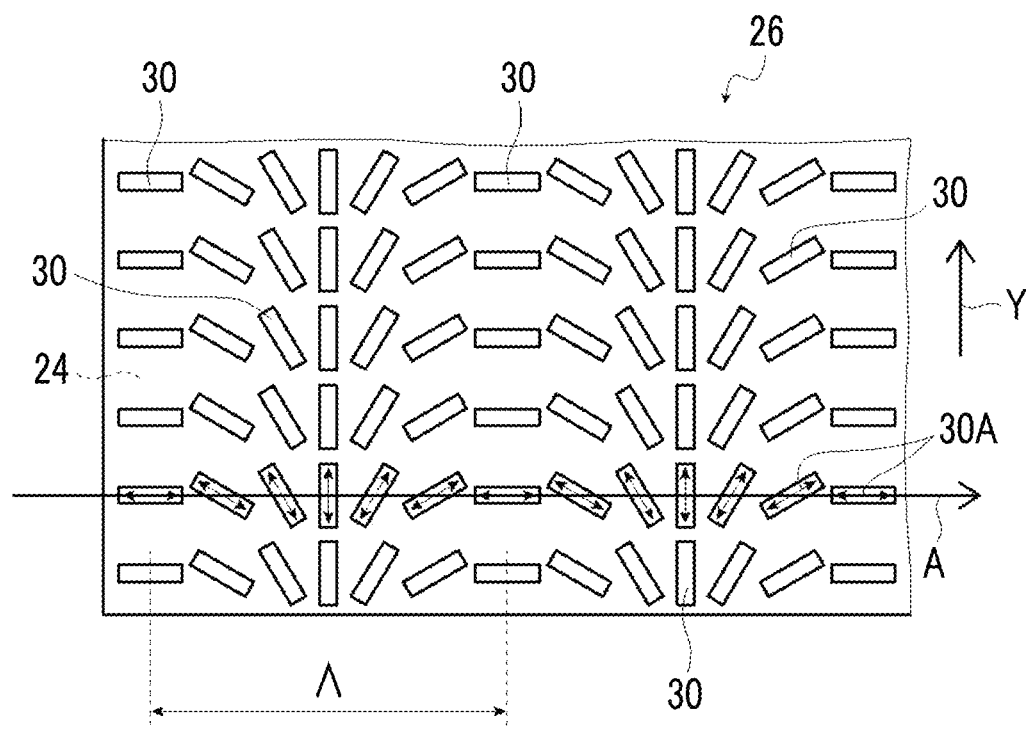
FIG. 15 is a conceptual diagram of a plane of the liquid crystal optical element shown in FIG. 14.

FIGS. 14 and 15 conceptually show an example of a reflective liquid crystal optical element. Since a liquid crystal optical element 104 shown in FIGS. 14 and 15 frequently uses the same members as in the liquid crystal optical element shown in FIG. 9 and the like, the same members are represented by the same reference numerals, and the following description will be given mainly to different parts.

FIG. 14 is a diagram conceptually showing a layer configuration of a reflective liquid crystal optical element 104. The liquid crystal optical element 104 has a support 20, an alignment film 24, and a cholesteric liquid crystal layer 34 as a liquid crystal diffraction element that exhibits the action as the reflective liquid crystal optical element 104.

FIG. 15 is a schematic view showing an alignment state of the liquid crystal compound 30 in a plane of a main surface of the cholesteric liquid crystal layer 34. FIG. 15 shows the alignment state of the cholesteric liquid crystal layer 34 in a surface facing the alignment film 24.

As shown in FIG. 14, the cholesteric liquid crystal layer 34 is a layer where the liquid crystal compound 30 is cholesterically aligned. FIGS. 14 and 15 show an example of a case where the liquid crystal compound forming the cholesteric liquid crystal layer is a rod-like liquid crystal compound.

In the following description, the cholesteric liquid crystal layer is also simply referred to as a liquid crystal layer.

Support

The support 20 supports the alignment film 24 and the liquid crystal layer 34.

As the support 20, the same support as in the above-described transmissive liquid crystal optical element may be used.

Alignment Film

In the liquid crystal optical element 104, the alignment film 24 is formed on a surface of the support 20.

The alignment film 24 is an alignment film for aligning the liquid crystal compound 30 in a predetermined liquid crystal alignment pattern in a case of forming the liquid crystal layer 34.

Though described below, even in the reflective liquid crystal optical element 104 shown in FIG. 14 and the like, similarly to the optically anisotropic layer 26 of the transmissive liquid crystal optical element 104 shown in FIG. 9 and the like described above, the liquid crystal layer 34 has a liquid crystal alignment pattern in which an orientation of an optical axis 30A (see FIG. 10) derived from the liquid crystal compound 30 changes while continuously rotating along one in-plane direction (arrow A direction).

Accordingly, as the alignment film 24, the same alignment film as in the transmissive liquid crystal optical element 104 shown in FIG. 9 and the like can be used, and the alignment film 24 may be produced similarly to the alignment film in the transmissive liquid crystal optical element 104 shown in FIG. 9.

Cholesteric Liquid Crystal Layer (Liquid Crystal Layer)

In the liquid crystal optical element 104, the liquid crystal layer 34 is formed on a surface of the alignment film 24.

The liquid crystal layer 34 is a cholesteric liquid crystal layer formed by cholesterically aligning a liquid crystal compound and immobilizing a cholesteric liquid crystalline phase. In the example, the cholesteric liquid crystal layer has a liquid crystal alignment pattern in which an orientation of an optical axis derived from the liquid crystal compound changes while continuously rotating along at least one in-plane direction.

As conceptually shown in FIG. 14, the liquid crystal layer 34 has a helical structure in which the liquid crystal compound 30 is helically turned and laminated as in a cholesteric liquid crystal layer formed by immobilizing a typical cholesteric liquid crystalline phase. In the helical structure, a configuration in which the liquid crystal compound 30 is helically rotated once (rotated by 360°) and laminated is set as one helical pitch (helical pitch P), and a plurality of pitches of the helically turned liquid crystal compound 30 are laminated.

As well known in the art, the cholesteric liquid crystalline phase exhibits selective reflectivity with respect to any of right or left circularly polarized light at a specific wavelength. Determination is made whether reflected light is right circularly polarized light or left circularly polarized light depending on a helical twisted direction (sense) of the cholesteric liquid crystalline phase. In regard to selective reflection of the circularly polarized light by the cholesteric liquid crystalline phase, in a case where the helical twisted direction of the cholesteric liquid crystalline phase is right, the right circularly polarized light is reflected, and in a case where the helical twisted direction is left, the left circularly polarized light is reflected.

A turning direction of the cholesteric liquid crystalline phase can be adjusted depending on the kind of the liquid crystal compound for forming the cholesteric liquid crystal layer and/or the kind of a chiral agent to be added.

A half-width $\Delta\lambda$ (nm) of a selective reflection range (circularly polarized light reflection range) where selective reflection is exhibited depends on $\Delta n$ of the cholesteric liquid crystalline phase and a helical pitch P, and follows a relationship "$\Delta\lambda = \Delta n \times$ helical pitch". For this reason, the width of the selective reflection range can be controlled by adjusting $\Delta n$. $\Delta n$ can be adjusted by adjusting the kind of the liquid crystal compound for forming the cholesteric liquid crystal layer, a mixing ratio thereof, and a temperature during alignment immobilization, Accordingly, in regard to a wavelength of light that is reflected (diffracted) by the liquid crystal layer 34, a selective reflection wavelength range may be appropriately set by adjusting the helical pitch P of the liquid crystal layer 34, for example.

As shown in FIG. 15, in the liquid crystal layer 34, the liquid crystal compounds 30 are arranged along the arrow A direction and the Y direction perpendicular to the arrow A direction. The orientation of the optical axis 30A of the liquid crystal compound 30 changes while continuously rotating in one in-plane direction, that is, the arrow A direction. In the Y direction, the liquid crystal compounds 30 having the same orientation of the optical axis 30A are aligned at regular intervals.

"The orientation of the optical axis 30A of the liquid crystal compound 30 changes while continuously rotating in one in-plane direction" means that, similarly to the above-described optically anisotropic layer 26, an angle between the optical axis 30A of the liquid crystal compound 30 and the arrow A direction varies depending on a position of the arrow A direction, and an angle between the optical axis 30A and the arrow A direction sequentially changes from $\theta$ to $\theta+180°$ or $\theta-180°$ in the arrow A direction. That is, in a plurality of liquid crystal compounds 30 that are arranged along the arrow A direction, as shown in FIG. 15, the optical axis 30A changes while rotating by a given angle along the arrow A direction.

A difference between the angles of the optical axes 30A of the liquid crystal compounds 30 adjacent to each other in the arrow A direction is preferably equal to or less than 45°, more preferably equal to or less than 15°, and still more preferably less than 15°.

Similarly to the above-described optically anisotropic layer 26, even in the liquid crystal layer 34, in the liquid crystal alignment pattern of the liquid crystal compound 30, a length (distance) over which the optical axis 30A of the liquid crystal compound 30 rotates by 180° in the arrow A direction in which the optical axis 30A changes while continuously rotating in a plane is set as a length $\Lambda$ of a single period in the liquid crystal alignment pattern.

In the following description, the length $\Lambda$ of the single period is also referred to as "single period $\Lambda$".

The liquid crystal alignment pattern of the liquid crystal layer 34 repeats the single period $\Lambda$ in the arrow A direction, that is, in one direction in which the orientation of the optical axis 30A changes while continuously rotating. The liquid crystal optical element 104 is a liquid crystal diffraction element, and similarly to the above, the single period $\Lambda$ is a period (single period) of a diffraction structure.

On the other hand, in the liquid crystal compound 30 for forming the liquid crystal layer 34, the orientation of the optical axis 30A is the same in a direction (in FIG. 15, the Y direction) perpendicular to the arrow A direction, that is, in the Y direction perpendicular to one direction in which the optical axis 30A continuously rotates.

In other words, in the liquid crystal compound 30 for forming the liquid crystal layer 34, the angle between the optical axis 30A of the liquid crystal compound 30 and the arrow A direction (X direction) is the same in the Y direction.

Figure 16:
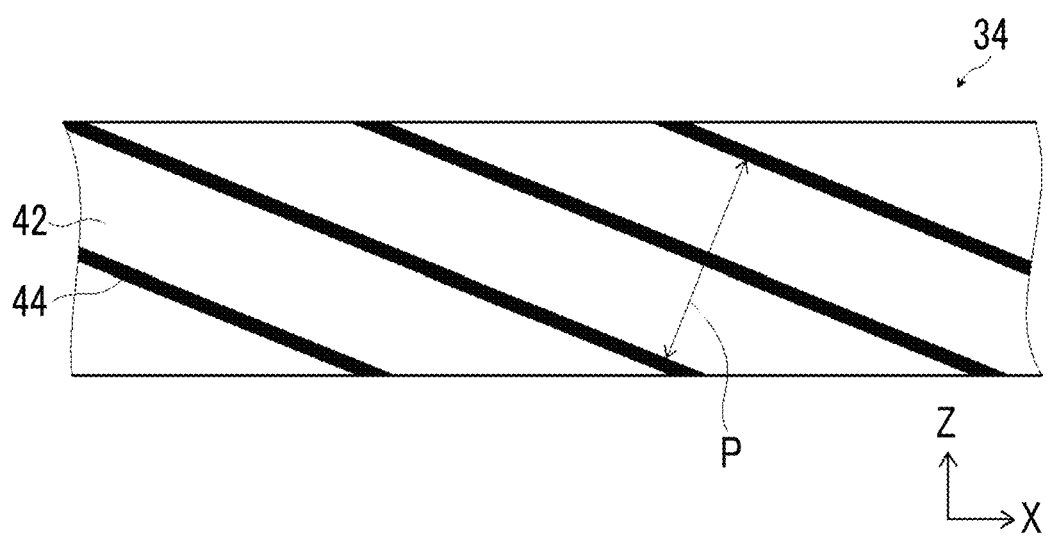
FIG. 16 is a diagram conceptually showing a cross section of the liquid crystal optical element shown in FIG. 14.

In a case where a cross section of the liquid crystal layer 34 shown in FIG. 14 in an X-Z direction is observed with a scanning electron microscope (SEM), a stripe pattern is observed where an arrangement direction in which bright portions 42 and dark portions 44 shown in FIG. 16 are alternately arranged is tilted at a predetermined angle with respect to a main surface (X-Y plane).

An interval between the bright portion 42 and the dark portion 44 basically depends on the helical pitch P of the cholesteric liquid crystal layer.

Accordingly, a wavelength range of light that is selectively reflected by the cholesteric liquid crystal layer is correlated with the interval between the bright portion 42 and the dark portion 44. That is, in a case where the interval between the bright portion 42 and the dark portion 44 is long, since the helical pitch P is long, a wave in the wavelength range of light selectively reflected by the cholesteric liquid crystal layer has a long wavelength. On the contrary, in a case where the interval between the bright portion 42 and the dark portion 44 is short, the helical pitch P is short. As a result, the wave in the wavelength range of light selectively reflected by the cholesteric liquid crystal layer has a short wavelength.

In the cholesteric liquid crystal layer, two repetitions of the bright portion 42 and the dark portion 44 correspond to the helical pitch P. Accordingly, in the cross section observed with the SEM, an interval between the bright portion 42 and the bright portion 42 adjacent to each other or between the dark portion 44 and the dark portion 44 adjacent to each other in a normal direction (perpendicular direction) to a line made of the bright portion 42 or the dark portion 44 corresponds to a ½ pitch of the helical pitch P.

That is, the helical pitch P may be measured with the interval of the lines between the bright portion 42 and the bright portion 42 or the dark portion 44 and the dark portion 44 in the normal direction as a ½ pitch.

Hereinafter, the action of diffraction by the liquid crystal layer 34 will be described.

In a cholesteric liquid crystal layer of the related art, a helical axis derived from a cholesteric liquid crystalline phase is perpendicular to a main surface, and a reflecting surface is a surface parallel to the main surface. An optical axis of a liquid crystal compound is not tilted with respect to the main surface. In other words, the optical axis is parallel to the main surface. Accordingly, in a case where an X-Z plane of the cholesteric liquid crystal layer of the related art is observed with the SEM, an alignment direction in which bright portions and dark portions are arranged is perpendicular to the main surface.

Since the cholesteric liquid crystalline phase has specular reflectivity, for example, in a case where light is incident from a normal direction to the cholesteric liquid crystal layer, light is reflected in the normal direction.

Figure 17:
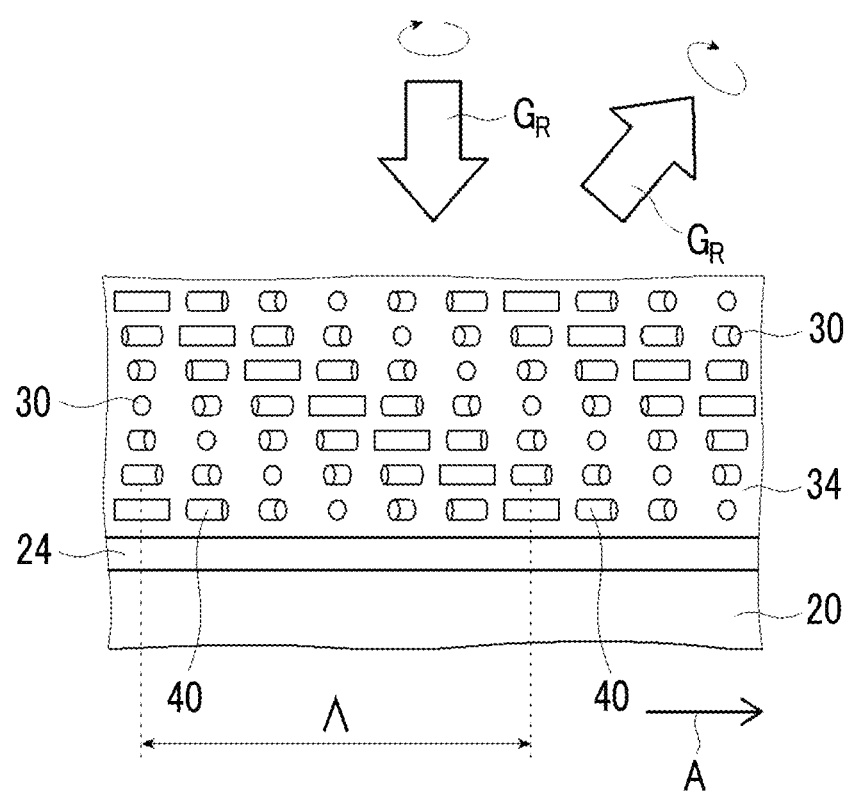
FIG. 17 is a conceptual diagram illustrating the action of the liquid crystal optical element shown in FIG. 14.

In contrast, the liquid crystal layer 34 tilts and reflects incident light in the arrow A direction with respect to specular reflection. The liquid crystal layer 34 has a liquid crystal alignment pattern in which the optical axis 30A changes while continuously rotating along the arrow A direction (predetermined one direction) in the plane. Hereinafter, description will be given referring to FIG. 17.

As an example, it is assumed that the liquid crystal layer 34 is a cholesteric liquid crystal layer that selectively reflects a right circularly polarized light $G_R$ of green light. Accordingly, in a case where light is incident into the liquid crystal layer 34, the liquid crystal layer 34 reflects only right circularly polarized light $G_R$ of the green light and transmits other light components.

In the liquid crystal layer 34, the optical axis 30A of the liquid crystal compound 30 changes while rotating along the arrow A direction (one direction).

The liquid crystal alignment pattern formed in the liquid crystal layer 34 is a pattern that is periodic in the arrow A direction. For this reason, as conceptually shown in FIG. 17, the right circularly polarized light $G_R$ of the green light is incident into the liquid crystal layer 34 is reflected (diffracted) in a direction depending on the period of the liquid crystal alignment pattern, and the reflected right circularly polarized light $G_R$ of the green light is reflected (diffracted) in a direction tilted in the arrow A direction with respect to the XY plane (the main surface of the cholesteric liquid crystal layer).

Accordingly, as an example, in a case of the optical coupling system shown in FIG. 5, for example, the signal light 103 can be separated by placing a member that specularly reflects light, on a back surface side of the liquid crystal optical element 104 having the (cholesteric) liquid crystal layer 34. As a specular reflective member, a known member can be used.

As an example, it is assumed that the liquid crystal layer 34 of the liquid crystal optical element 104 selectively reflects right circularly polarized light. In this case, in a case where the signal light 103 emitted from the optical fiber 102 is incident into the liquid crystal optical element 104, a component close to right circularly polarized light is diffracted and reflected by the liquid crystal layer 34 and becomes signal light 107. In contrast, a component in the signal light 103 close to left circularly polarized light is transmitted through the liquid crystal layer 34, is specularly reflected by the specular reflective member, and becomes signal light 105.

That is, with the liquid crystal optical element of the (cholesteric) liquid crystal layer 34 and the specular reflective member, the signal light 103 can be separated into the signal light 105 and the signal light 107, and the signal light 105 and the signal light 107 can be reflected in different directions.

The diffracted and reflected signal light 107 and the specularly reflected signal light 105 travel in separate directions similarly to the above-described example. Thereafter, for example, the signal light 105 is incident into the grating coupler 110a of the photonic chip 112a provided in the photonic device 112, and the signal light 107 is incident into the grating coupler 110b of the photonic chip 112b provided in the photonic device 112.

Alternatively, even though a cholesteric liquid crystal layer that selects has circularly polarized light a turning direction of which is opposite to that of circularly polarized light selectively reflected by the liquid crystal layer 34 having the liquid crystal alignment pattern, and does not have a liquid crystal alignment pattern is provided instead of the specular reflective member, similarly, the incident signal light 103 can be separated while dividing into diffraction reflection and specular reflection depending on the component of circularly polarized light.

In the liquid crystal layer 34, a reflection direction (diffraction angle) of light can be adjusted by appropriately setting a direction of the arrow A direction that is one direction in which the optical axis 30A rotates.

In a case of reflecting circularly polarized light with the same wavelength and the same turning direction, a reflection direction of circularly polarized light can be reversed by reversing the rotation direction of the optical axis 30A of the liquid crystal compound 30 toward the arrow A direction.

For example, in FIGS. 14 and 15, although the rotation direction of the optical axis 30A toward the arrow A direction is clockwise, and certain circularly polarized light is reflected in a state of being tilted in the arrow A direction, as the rotation direction of the optical axis 30A is set to be counterclockwise, certain circularly polarized light is reflected in a state of being tilted in a direction opposite to the arrow A direction.

In the liquid crystal layer having the same liquid crystal alignment pattern, the reflection direction is reversed by the helical turning direction of liquid crystal compound 30, that is, the turning direction of circularly polarized light to be reflected.

For example, in a case where the helical turning direction of the liquid crystal layer is right-twisted, the liquid crystal layer selectively reflects right circularly polarized light, and has the liquid crystal alignment pattern in which the optical axis 30A rotates clockwise along the arrow A direction, whereby the right circularly polarized light is reflected in a state of being tilted in the arrow A direction.

For example, in a case where the helical turning direction of the liquid crystal layer is left-twisted, the liquid crystal layer that selectively reflects left circularly polarized light, and has the liquid crystal alignment pattern in which the optical axis 30A rotates clockwise along the arrow A direction reflects the left circularly polarized light in a state of being tilted in the arrow A direction.

As described above, in the liquid crystal layer 34 (liquid crystal optical element 104) that acts as the reflective liquid crystal optical element 104, in the liquid crystal alignment pattern of the liquid crystal compound 30, the single period Λ that is the length over which the optical axis 30A of the liquid crystal compound 30 rotates by 180° is the period (single period) of the diffraction structure. In the liquid crystal layer 34, one direction (arrow A direction) in which the optical axis 30A of the liquid crystal compound 30 changes while rotating is a periodic direction of the diffraction structure.

In the liquid crystal layer having the liquid crystal alignment pattern, as the single period Λ decreases, a diffraction angle of reflected light with respect to incident light increases. That is, as the single period Λ decreases, incident light can be largely diffracted and reflected in a direction largely different from specular reflection.

In the present invention, the single period Λ of the liquid crystal layer 34 is not limited, and the single period Λ in which the signal light 103 can be separated may be appropriately set depending on the wavelength or the like of the signal light 103 to be assumed.

The single period Λ of the liquid crystal layer 34 is preferably 0.1 to 20 μm, and more preferably 0.1 to 10 μm.

Forming Method of Liquid Crystal Layer

The liquid crystal layer 34 can be formed by immobilizing a liquid crystalline phase where the liquid crystal compound 30 is aligned in a predetermined alignment state, in a layer shape. For example, a cholesteric liquid crystal layer can be formed by immobilizing a cholesteric liquid crystalline phase in a layer shape.

A structure in which the cholesteric liquid crystalline phase is immobilized may be a structure in which the alignment of the liquid crystal compound as a liquid crystalline phase is immobilized. It is preferable that the structure in which the cholesteric liquid crystalline phase is immobilized is a structure that is obtained by bringing a polymerizable liquid crystal compound into a state where a predetermined liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or external force.

In the structure in which the liquid crystalline phase is immobilized, it should suffice that the optical characteristics of the liquid crystalline phase are maintained, and the liquid crystal compound 30 in the liquid crystal layer may not exhibit liquid crystallinity. For example, the molecular weight of the polymerizable liquid crystal compound may be increased by a curing reaction such that the liquid crystallinity of the polymerizable liquid crystal compound is lost.

The same also applies to the above-described optically anisotropic layer 26.

Examples of a material used for forming the liquid crystal layer 34 include a liquid crystal composition containing a liquid crystal compound. It is preferable that the liquid crystal compound is a polymerizable liquid crystal compound.

Examples of the liquid crystal composition for forming the (cholesteric) liquid crystal layer 34 include a liquid crystal composition obtained by adding a chiral agent for helically aligning the liquid crystal compound 30 to the liquid crystal composition that forms the optically anisotropic layer 26 of the above-described transmissive liquid crystal optical element 104.

Chiral Agent (Optically Active Compound)

The chiral agent has a function of causing a helical structure of a cholesteric liquid crystalline phase. The chiral agent may be selected depending on the purpose because a helical twisted direction or a helical pitch P derived from the compound varies.

The chiral agent is not particularly limited, and a known compound (for example, Liquid Crystal Device Handbook, Chapter 3, Article 4-3, chiral agent for twisted nematic (TN) or super twisted nematic (STN), p. 199, No. 142 Committee of Japan Society for the Promotion of Science, 1989), isosorbide, or an isomannide derivative can be used.

In general, the chiral agent contains an asymmetic carbon atom; however, an axially asymmetric compound or a planar asymmetric compound not containing an asymmetric carbon atom can also be used as the chiral agent. Examples of the axially asymmetric compound or the planar asymmetric compound include binaphthyl, helicene, paracyclophane, and derivatives thereof. The chiral agent may have a polymerizable group. In a case where both the chiral agent and the liquid crystal compound have a polymerizable group, a polymer that has a repeating unit derived from the polymerizable liquid crystal compound and a repeating unit derived from the chiral agent can be formed with a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

The chiral agent may be a liquid crystal compound.

In a case where the chiral agent has a photoisomerization group, it is preferable because a pattern having a desired reflection wavelength corresponding to an emission wavelength can be formed by irradiation of an actinic ray or the like through a photomask after coating and alignment. As the photoisomerization group, an isomerization portion of a photochromic compound, an azo group, an azoxy group, or a cinnamoyl group is preferably used. Specific examples of the compound include compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

A content of the chiral agent in the liquid crystal composition is preferably 0.01 to 200% by mol, and more preferably 1 to 30% by mole, with respect to a content molar amount of the liquid crystal compound.

In forming the liquid crystal layer 34, it is preferable that the liquid crystal composition is coated on a forming surface of the liquid crystal layer 34, the liquid crystal compound 30 is aligned in a state of a desired liquid crystalline phase, and then, the liquid crystal compound 30 is cured, thereby forming the liquid crystal layer 34.

That is, in a case of forming a cholesteric liquid crystal layer on the alignment film 24, it is preferable that the liquid crystal composition is coated on the alignment film 24, the liquid crystal compound 30 is aligned in a state of a cholesteric liquid crystalline phase, and the liquid crystal compound 30 is cured, thereby the liquid crystal layer 34 in which the cholesteric liquid crystalline phase is immobilized.

The coated liquid crystal composition is dried and/or heated as needed, and then, is cured to form the liquid crystal layer. In the step of drying and/or heating, the liquid crystal compound 30 in the liquid crystal composition should be aligned to a cholesteric liquid crystalline phase. In heating, a heating temperature is preferably equal to or lower than 200° C., and more preferably equal to or lower than 130° C.

The aligned liquid crystal compound 30 is further polymerized as needed. In regard to the polymerization, thermal polymerization or photopolymerization using light irradiation may be performed, and photopolymerization is preferable. The same also applies to the above-described optically anisotropic layer 26.

In regard to the light irradiation, ultraviolet light is preferably used. Irradiation energy is preferably 20 mJ/cm$^2$ to 50 J/cm$^2$, and more preferably 50 to 1500 mJ/cm$^2$. To promote a photopolymerization reaction, light irradiation may be performed under heating conditions or in a nitrogen atmosphere. A wavelength of irradiated ultraviolet light is preferably 250 to 430 nm.

A thickness of the liquid crystal layer 34 is not limited, and the thickness at which required light reflectance is obtained may be appropriately set depending on the purpose of the diffraction element, light reflectance required for the liquid crystal layer, the material for forming the liquid crystal layer 34, and the like.

In the optical coupling system of the present invention, a wavelength range that is selectively reflected by the (cholesteric) liquid crystal layer 34 of the liquid crystal optical element 104 is not limited and may be appropriately set depending on a wavelength of signal light that is handled by the optical coupling system.

Although the liquid crystal optical element 104 of the example shown in the drawing has one liquid crystal layer 34, the present invention is not limited thereto, and the liquid crystal optical element 104 may have a plurality of liquid crystal layers 34 that selectively reflect different wavelength ranges.

For example, the liquid crystal optical element 104 may have two liquid crystal layers 34 of a liquid crystal layer 34 that selectively reflects red light and a liquid crystal layer 34 that selectively reflects green light. Alternatively, the liquid crystal optical element 104 may have two liquid crystal layers 34 of a liquid crystal layer 34 that selectively reflects green light and a liquid crystal layer 34 that selectively reflects blue light. In addition, the liquid crystal optical element 104 may have three liquid crystal layers 34 of a liquid crystal layer 34 that selectively reflects red light, a liquid crystal layer 34 that selectively reflects green light, and a liquid crystal layer 34 that selectively reflects blue light.

Both the optically anisotropic layer 26 and the (cholesteric) liquid crystal layer 34 have the liquid crystal alignment pattern in which the optical axis 30A of the liquid crystal compound 30 continuously rotates toward one in-plane direction (arrow A direction).

In contrast, the alignment of the liquid crystal compound in the liquid crystal optical element is designed precisely, whereby it is possible to produce a liquid crystal optical element that collects each signal light component (beam) to be spatially separated.

Figure 7:
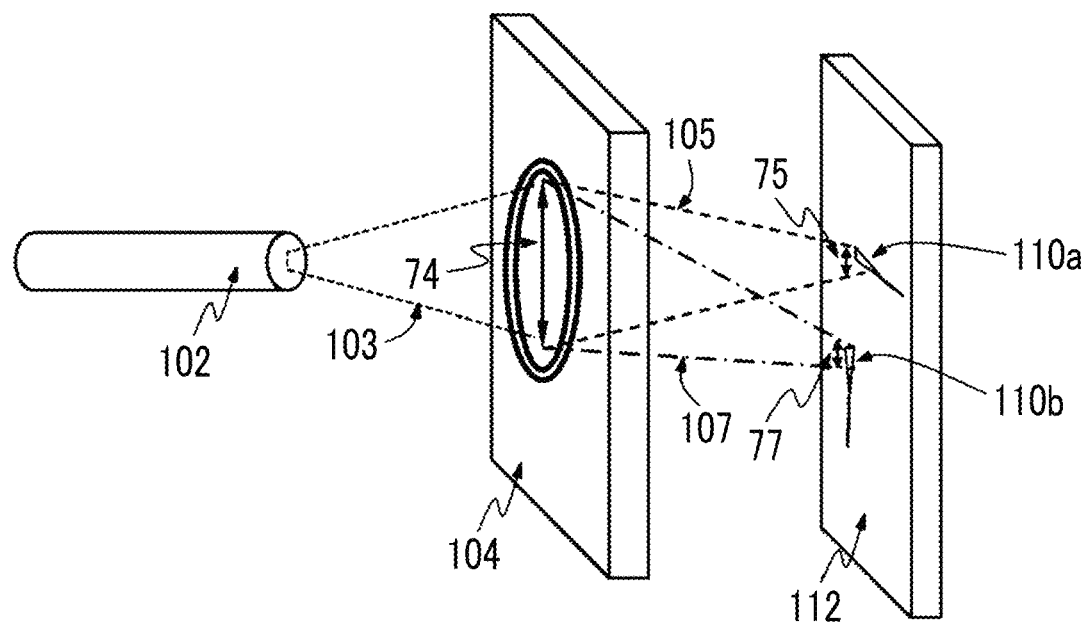
FIG. 7 is a conceptual diagram of another example of an optical coupling system of the present invention.

FIG. 7 is a conceptual diagram of an example of an optical coupling system using the liquid crystal optical element 104 that collects signal light.

The signal light 103 that is emitted from the optical fiber 102 and is incident into the liquid crystal optical element 104 is diffused light in many cases.

A first main surface of the liquid crystal optical element 104 (or liquid crystal optical elements of a liquid crystal optical element array 204) has a sufficiently large size with respect to a spot size 74 of the signal light 103 that is incident into the liquid crystal optical element 104 from the optical fiber 102.

The liquid crystal optical element 104 that collects the signal light 105 and the signal light 107 separated and emitted, narrows a spot size 75 of the signal light 105 that is incident into the grating coupler 110a, and narrows a spot size 77 of the signal light 107 that is incident into the grating coupler 110b. With this, it is possible to reduce the grating coupler 110a and the grating coupler 110b that configure the photonic chip. As a result, the photonic device (photonic chip) is allowed to be designed smaller with respect to the optical fiber (optical fiber array) and the liquid crystal optical element (liquid crystal optical array).

With the use of the liquid crystal optical element having a function of collecting light, it is possible to remove a lens or a lens array that is required on an emission side in a beam displacer made of an inorganic material of the related art. This contributes to a reduction in the number of parts and a reduction in mounting size of the optical coupling system and an optical communication system including the optical coupling system.

Figure 18:
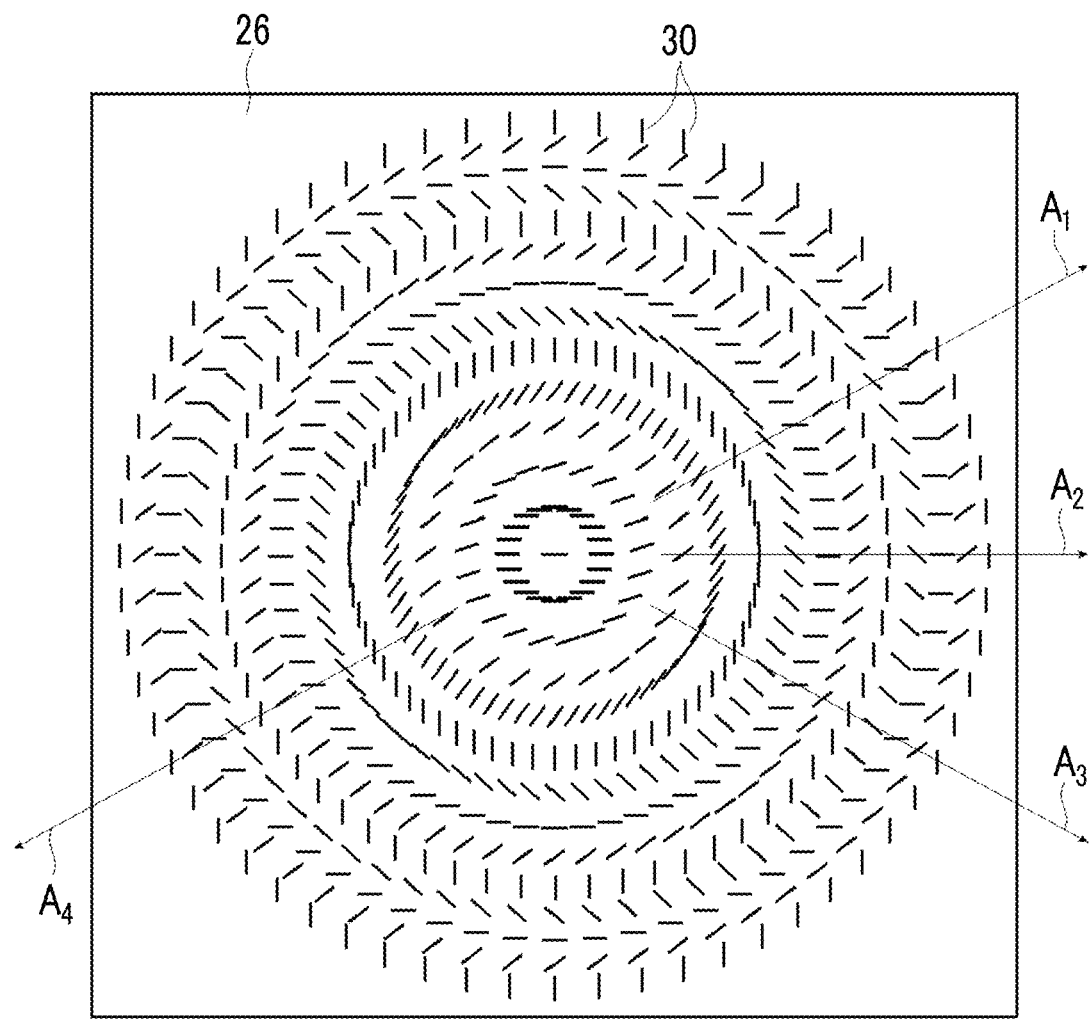
FIG. 18 is a conceptual diagram of another example of a liquid crystal optical element that is used in the optical coupling system of the present invention.

Examples of the liquid crystal optical element having the light collection function include a liquid crystal optical element that has an optically anisotropic layer 26 having a liquid crystal alignment pattern conceptually shown in a plan view of FIG. 18.

The optically anisotropic layer 26 has a liquid crystal alignment pattern in which an orientation of an optical axis derived from a liquid crystal compound changes while continuously rotating toward one direction, in a radial shape from an inside toward an outside. That is, the liquid crystal alignment pattern of the optically anisotropic layer 26 shown in FIG. 18 is a concentric circular pattern that has one direction in which the orientation of the optical axis derived from the liquid crystal compound 30 changes while continuously rotating, in a concentric circular shape from the inside toward the outside.

In the optically anisotropic layer 26, the orientation of the optical axis of the liquid crystal compound 30 changes along many directions from a center of the optically anisotropic layer 26 toward an outside, for example, a direction indicated by an arrow $A_1$, a direction indicated by an arrow $A_2$, a direction indicated by an arrow $A_3$, a direction indicated by an arrow $A_4$, . . . while continuously rotating.

Accordingly, in the optically anisotropic layer 26, a rotation direction of the optical axis of the liquid crystal compound 30 is the same direction in all directions (one direction). In the example shown in the drawing, the rotation direction of the optical axis of the liquid crystal compound 30 is counterclockwise in all directions of the direction indicated by the arrow $A_1$, the direction indicated by the arrow $A_2$, the direction indicated by the arrow $A_3$, and the direction indicated by the arrow $A_4$.

That is, in a case where the arrow $A_1$ and the arrow $A_4$ are regarded as one straight line, the rotation direction of the optical axis of the liquid crystal compound 30 is reversed at the center of the optically anisotropic layer 26 on the straight line. As an example, it is assumed that the straight line formed of the arrow $A_1$ and the arrow $A_4$ is toward a right direction (an arrow A1 direction) in the drawing. In this case, the optical axis of the liquid crystal compound 30 initially rotates clockwise from an outer direction toward the center of the optically anisotropic layer 26, the rotation direction is reversed at the center of the optically anisotropic layer 26, and thereafter, the optical axis of the liquid crystal compound 30 rotates counterclockwise from the center toward the outer direction of the optically anisotropic layer 26.

As described above, the optically anisotropic layer 26 having the liquid crystal alignment pattern in which the optical axis of the liquid crystal compound 30 continuously rotates toward one direction refracts incident circularly polarized light in an opposite direction depending on a turning direction of the circularly polarized light.

In the optically anisotropic layer (liquid crystal optical element) having the liquid crystal alignment pattern in which the orientation of the optical axis of the liquid crystal compound 30 changes while continuously rotating toward one direction, a refraction direction of light to be transmitted therethrough depends on a rotation direction of the optical axis of the liquid crystal compound 30. That is, in the liquid crystal alignment pattern, in a case where the rotation direction of the optical axis of the liquid crystal compound 30 is reversed, the refraction direction of transmitted light is reversed with respect to one direction in which the optical axis rotates.

A diffraction angle by the optically anisotropic layer 26 increases as the single period Λ decreases. That is, diffraction of light by the optically anisotropic layer 26 increases as the single period Λ decreases.

Accordingly, in the optically anisotropic layer 26 having the liquid crystal alignment pattern in a concentric circular shape, that is, the liquid crystal alignment pattern in which the optical axis changes while continuously rotating in a radial shape, transmission of a plurality of incident light (light beams) can be converged depending on the rotation direction of the optical axis of the liquid crystal compound 30 and a turning direction of incident circularly polarized light.

With this, the optically anisotropic layer 26 shown in FIG. 18 separates the incident signal light 103 depending on the turning direction of polarized light and collects the separated signal light 105 and signal light 107.

The liquid crystal alignment pattern in which the optical axis changes while continuously rotating in a radial shape can also be used in the reflective liquid crystal optical element shown in FIGS. 5 and 14.

Figure 19:
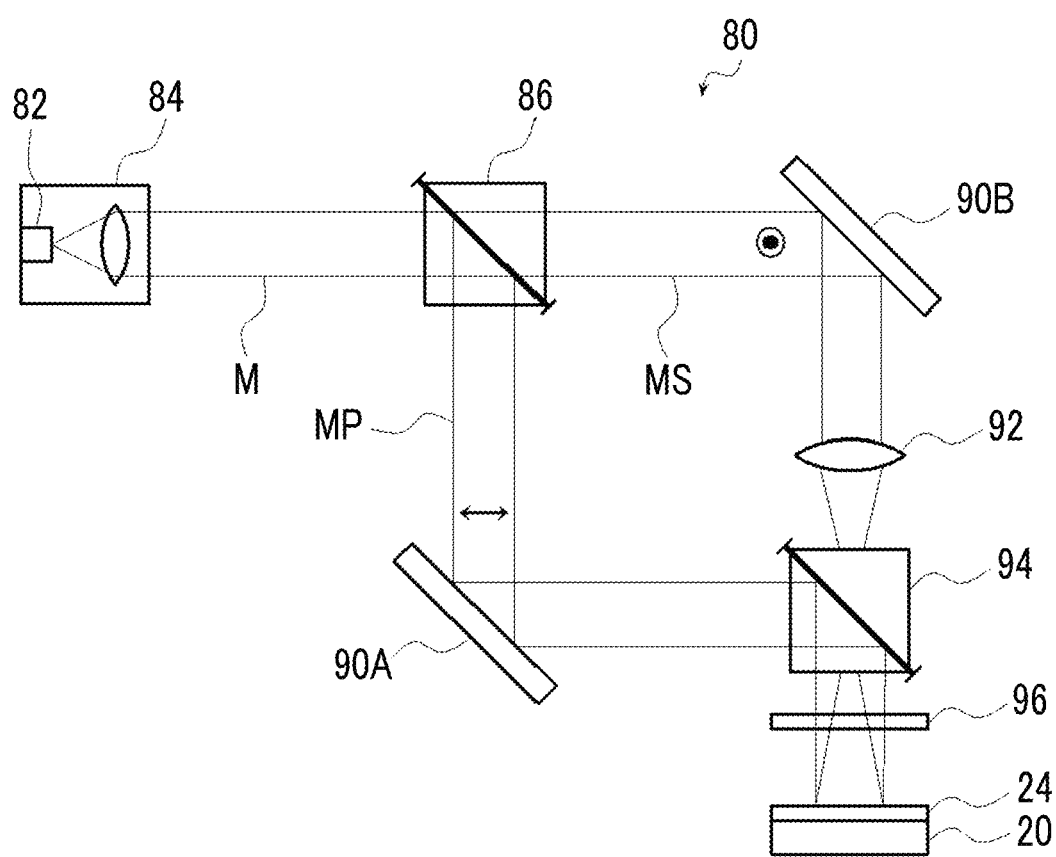
FIG. 19 is a conceptual diagram of an example of an exposure device that exposes an alignment film of the liquid crystal optical element shown in FIG. 18.

FIG. 19 conceptually shows an example of an exposure device that exposes the alignment film 24 to form the alignment pattern shown in FIG. 18 corresponding to the liquid crystal alignment pattern in which the optical axis changes while continuously rotating in a radial shape.

An exposure device 80 shown in FIG. 19 has a light source 84 that comprises a laser 82, a polarization beam splitter 86 that splits laser light M from the laser 82 into S-polarized light MS and P-polarized light MP, a mirror 90A disposed in an optical path of P-polarized light MP, a mirror 90B disposed in an optical path of the S-polarized light MS, a lens 92 that disposed in the optical path of the S-polarized light MS, a polarization beam splitter 94, and a λ/4 plate 96.

The P-polarized light MP that is split in the polarization beam splitter 86 is reflected by the mirror 90A and is incident into the polarization beam splitter 94. On the other hand, the S-polarized light MS that is split in the polarization beam splitter 86 is reflected by the mirror 90B, is collected by the lens 92, and is incident into the polarization beam splitter 94.

The P-polarized light MP and the S-polarized light MS are multiplexed in the polarization beam splitter 94, are converted into right circularly polarized light and left circularly polarized light by the λ/4 plate 96 depending on a polarization direction, and are incident into the alignment film 24 on the support 20.

Here, due to interference between the right circularly polarized light and the left circularly polarized light, a polarization state of light with which the alignment film 24 is irradiated periodically changes to interference fringes. Since an intersecting angle between the left circularly polarized light and the right circularly polarized light changes from the inside toward the outside of a concentric circle, an exposure pattern in which a pitch changes from the inside toward the outside is obtained. With this, in the alignment film 24, a radial (concentric circular) alignment pattern in which an alignment state changes periodically is obtained.

In the exposure device 80, the single period of the liquid crystal alignment pattern in which the optical axis of the liquid crystal compound 30 continuously rotates by 180° along one direction can be controlled by changing a refractive power of the lens 92 (an F-Number of the lens 92), a focal length of the lens 92, a distance between the lens 92 and the alignment film 24, and the like.

The length of the single period of the liquid crystal alignment pattern in one direction in which the optical axis continuously rotates can be changed by adjusting the refractive power of the lens 92 (the F-Number of the lens 92).

Specifically, the length of the single period of the liquid crystal alignment pattern in one direction in which the optical axis continuously rotates can be changed depending on a light spread angle at which light spreads in the lens 92 to interfere parallel light. More specifically, in a case where the refractive power of the lens 92 is weak, light approximates parallel light. Thus, a length Λ of the single period of the liquid crystal alignment pattern gradually decreases from the inside toward the outside, and the F-Number increases. Conversely, in a case where the refractive power of the lens 92 is strong, the length Λ of the single period of the liquid crystal alignment pattern rapidly decreases from the inside toward the outside, and the F-Number decreases.

In the optical coupling system of the present invention, the above-described liquid crystal optical element may be fixed to a hard frame from a point of handleability in terms of substrate mounting and facilitation of disposition alignment. Alternatively, other optical members may be fixed to the hard frame together.

An example of this aspect will be described referring to a conceptual diagram of FIG. 8.

Figure 8:
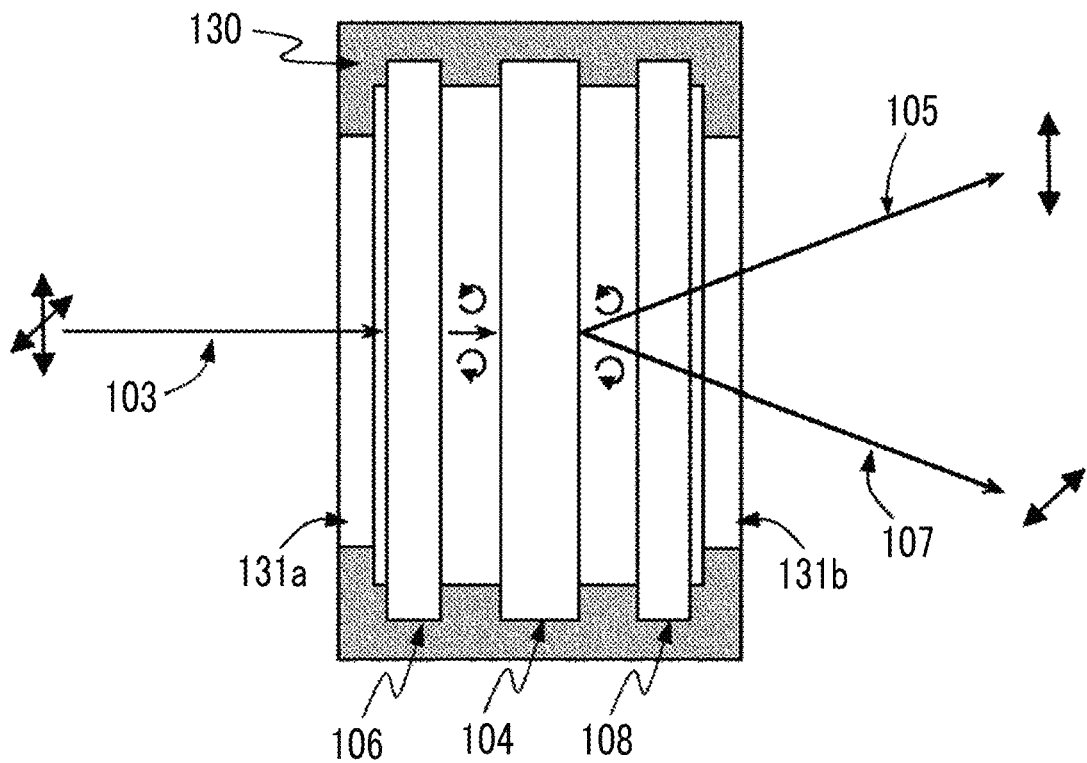
FIG. 8 is a conceptual diagram of an example of a combination of a liquid crystal optical element and other optical elements that are used in the optical coupling system of the present invention.

An example shown in FIG. 8 shows an example where the liquid crystal optical element shown in FIG. 6 or 9 described above that has the optically anisotropic layer having a predetermined liquid crystal alignment pattern is assembled as the liquid crystal optical element 104 in a hard frame 130.

The hard frame 130 has, for example, a substantially cylindrical shape or a substantially square tubular shape, and has an incidence-side aperture 131a and an emission-side aperture 131b in upper and lower surfaces. In the example, as an example of other optical elements to be fixed, an incidence-side λ/4 plate 106 and an emission-side λ/4 plate 108 are fixed to the frame 130. Specifically, in the frame 130, the incidence-side λ/4 plate 106, the liquid crystal optical element 104, and the emission-side λ/4 plate 108 are provided in this order downstream of the incidence-side aperture 131a in a traveling direction of the signal light 103, and the emission-side aperture 131b is positioned downstream thereof.

In the example, as an example, it is assumed that the signal light 103 emitted from the optical fiber includes two linearly polarized light components having polarizing axes (polarization directions) perpendicular to each other as conceptually shown in FIG. 8. The polarizing axes of the two linearly polarized light components in the signal light 103 are an up-down direction in FIG. 8 and a direction perpendicular to the paper plane of FIG. 8. In FIG. 8, polarized light having a polarizing axis in a direction perpendicular to the paper plane is expressed as an arrow in an oblique direction.

The incidence-side λ/4 plate 106 is disposed such that an in-plane optical axis (slow axis) is 45° with respect to the polarizing axis of each polarized light component of the signal light 103. The emission-side λ/4 plate 108 is also disposed such that an in-plane optical axis is 45° with respect to the polarizing axis of each polarized light component of the signal light 103.

The polarizing axis of the incident signal light 103 and the polarizing axes of the emitted signal light 105 and signal light 107 do not need to match or be perpendicular to each other, and can be freely changed by providing a mechanism for adjusting a direction of the in-plane optical axis of each λ/4 plate in the frame 130.

In this way, the hard frame is provided and the optical element in which a plurality of members are integrated is formed, whereby it is possible to facilitate handling in terms of mounting work and disposition alignment. In addition, the hard frame is provided and the optical element in which a plurality of members are integrated is formed, whereby it is possible to construct an optical coupling system that can sufficiently exhibit required functions while reducing a mounting size, and an optical communication device including the optical coupling system.

For example, as described above, the liquid crystal optical element 104 shown in FIGS. 6, 9, and the like has the optically anisotropic layer containing the liquid crystal compound and has the liquid crystal alignment pattern in which the optical axis continuously rotates toward one direction. The liquid crystal optical element 104 is a transmissive liquid crystal diffraction element that refracts (diffracts) incident right circularly polarized light and left circularly polarized light in opposite directions.

The incident signal light 103 includes linearly polarized light components having the polarizing axes perpendicular to each other. The incidence-side λ/4 plate 106 and the emission-side λ/4 plate 108 are disposed such that the in-plane optical axis is 45° with respect to the polarizing axis of each linearly polarized light component of the signal light 103.

In a case where the signal light 103 of the linearly polarized light is incident into the frame 130 having the incidence-side λ/4 plate 106, the liquid crystal optical element 104, and the emission-side λ/4 plate 108, as shown in FIG. 8, the signal light 103 passes through the incidence-side aperture 131a, and is first converted into circularly polarized light in an opposite turning direction by the incidence-side λ/4 plate 106.

The signal light 103 converted into circularly polarized light is subsequently incident into the liquid crystal optical element 104. As described above, the liquid crystal optical element 104 is a transmissive element that refracts circularly polarized light, and refracts circularly polarized light in a different turning direction to an opposite direction. Accordingly, the signal light 103 is separated into two circularly polarized light components in different traveling directions, that is, the signal light 105 and the signal light 107.

The signal light 105 and the signal light 107 as circularly polarized light are subsequently incident into the emission-side λ/4 plate 108. The direction of the optical axis of the emission-side λ/4 plate 108 matches the direction of the optical axis of the incidence-side λ/4 plate 106. Accordingly, the signal light 105 and the signal light 107 as circularly polarized light incident into the emission-side λ/4 plate 108 are converted into two linearly polarized light components having the polarizing axis in the same direction as the signal light 103 by the emission-side λ/4 plate 108.

The signal light 105 and the signal light 107 in different traveling directions converted into linearly polarized light pass through the emission-side aperture 131b and are incident into the corresponding grating couplers of the photonic device 112 as described above.

In this way, the signal light 103 is converted into linearly polarized light, and the liquid crystal optical element 104 having the above-described liquid crystal alignment pattern and the λ/4 plate are combined, whereby it is possible to sufficiently separate signal light while achieving a thin configuration compared to the related art, and to efficiently couple the optical fiber and the photonic device.

The optical coupling system of the present invention described above is mounted on a substrate to be combined with an optical fiber and a drive device as needed, whereby it is possible to configure an optical communication device of the present invention. While the optical communication device of the present invention is connected to a processing arithmetic device to configure an optical communication system, since the optical communication device is small-sized, it is possible to increase a communication capacity per mounting size, thereby contributing to high capacity in a communication infrastructure.

The optical coupling system of the present invention can be used an optical computer that configures an arithmetic circuit with an optical circuit, and a quantum computer using the principle. Benefits from the fact that a mounting size can be reduced with the optical coupling system of the present invention are sufficiently understood by those skilled in the art.

EXPLANATION OF REFERENCES

20: support
24: alignment film
26: optically anisotropic layer
30: liquid crystal compound
30A: optical axis
34: (cholesteric) liquid crystal layer
60: exposure device
62: laser
64: light source
65: λ/2 plate
68: polarization beam splitter
70A, 70B: mirror
72A, 72B: λ/4 plate
74, 75, 77: spot size
80: exposure device
82: laser
84: light source
86, 94: polarization beam splitter
90A, 90B: mirror
92: lens
96: λ/4 plate
100: optical coupling system
102: optical fiber
103, 105, 107: signal light
104: liquid crystal optical element
106: incidence-side λ/4 plate
108: emission-side λ/4 plate
110a, 110b: grating coupler
112: photonic device
112a, 112b: photonic chip
114, 116: layout axis
130: frame
131a: incidence-side aperture
131b: emission-side aperture
200: optical coupling system
202: optical fiber array
202a, 202b, 202c, 202d: optical fiber
204: liquid crystal optical element array
204a, 204b, 204c, 204d: liquid crystal optical element
601: optically anisotropic layer
605: liquid crystal compound
610: transparent substrate
615: surface
$L_1$, $L_4$: incident light
$L_2$, $L_5$: transmitted light
Q1, Q2: absolute phase
E1, E2: equiphase surface
$G_R$: right circularly polarized light of green light
M: laser light
MA, MB: ray
MS: S-polarized light
MP: P-polarized light
$P_O$: linearly polarized light
$P_R$: right circularly polarized light
$P_L$: left circularly polarized light

What is claimed is:

1. An optical coupling system comprising:
a λ/4 plate;
a liquid crystal optical element; and
a photonic device having a plurality of photonic chips, wherein the optical coupling system couples an optical fiber to the photonic device,
each of the plurality of photonic chips includes a grating coupler,
the liquid crystal optical element separates light incident from the optical fiber and emits light in different directions, and
each of light components separated by the liquid crystal optical element is incident into the grating coupler of the corresponding photonic chip,
the λ/4 plate, the liquid crystal optical element, and the photonic device are arranged in this order,
the λ/4 plate converts linearly polarized light into circularly polarized light with opposite turning directions when orthogonal linearly polarized light is incident, and
the liquid crystal optical element separates light depending on rotation direction of circularly polarized light.

2. The optical coupling system according to claim 1, wherein the optical coupling system deals with an optical fiber array having a plurality of the optical fibers, and
the optical coupling system has the liquid crystal optical element corresponding to each of the optical fibers of the optical fiber array.

3. The optical coupling system according to claim 1, wherein the liquid crystal optical element is a transmissive liquid crystal optical element that has a sheet shape and emits light incident from a first main surface facing the optical fiber from a second main surface different from the first main surface.

4. The optical coupling system according to claim 3, wherein the transmissive liquid crystal optical element has an optically anisotropic layer formed of a composition containing a liquid crystal compound, and
the optically anisotropic layer has a liquid crystal alignment pattern in which an orientation of an optical axis derived from the liquid crystal compound changes while continuously rotating toward at least one in-plane direction.

5. The optical coupling system according to claim 1, wherein the liquid crystal optical element is a reflective liquid crystal optical element that has a sheet shape and reflects light incident from a first main surface facing the optical fiber to emit the light from the first main surface.

6. The optical coupling system according to claim 5, wherein the reflective liquid crystal optical element has a cholesteric liquid crystal layer formed by cholesterically aligning a liquid crystal compound, and
the cholesteric liquid crystal layer has a liquid crystal alignment pattern in which an orientation of an optical axis derived from the liquid crystal compound changes while continuously rotating along at least one in-plane direction.

7. The optical coupling system according to claim 1, wherein the liquid crystal optical element is a light collecting liquid crystal optical element that collects incident light to the emit light toward the grating coupler.

8. The optical coupling system according to claim 7, wherein the light collecting liquid crystal optical element has a liquid crystal layer having a liquid crystal compound, and
the liquid crystal layer has a liquid crystal alignment pattern in which an orientation of an optical axis derived from the liquid crystal compound changes while continuously rotating toward one in-plane direction, in a radial shape from an inside toward an outside.

9. An optical communication device comprising:
the optical coupling system according to claim 1.

10. The optical coupling system according to claim 2,
wherein the liquid crystal optical element is a transmissive liquid crystal optical element that has a sheet shape and emits light incident from a first main surface facing the optical fiber from a second main surface different from the first main surface.

11. The optical coupling system according to claim 10,
wherein the transmissive liquid crystal optical element has an optically anisotropic layer formed of a composition containing a liquid crystal compound, and
the optically anisotropic layer has a liquid crystal alignment pattern in which an orientation of an optical axis derived from the liquid crystal compound changes while continuously rotating toward at least one in-plane direction.

12. The optical coupling system according to claim 2,
wherein the liquid crystal optical element is a reflective liquid crystal optical element that has a sheet shape and reflects light incident from a first main surface facing the optical fiber to emit the light from the first main surface.

13. The optical coupling system according to claim 12,
wherein the reflective liquid crystal optical element has a cholesteric liquid crystal layer formed by cholesterically aligning a liquid crystal compound, and
the cholesteric liquid crystal layer has a liquid crystal alignment pattern in which an orientation of an optical axis derived from the liquid crystal compound changes while continuously rotating along at least one in-plane direction.

14. The optical coupling system according to claim 2,
wherein the liquid crystal optical element is a light collecting liquid crystal optical element that collects incident light to the emit light toward the grating coupler.

15. The optical coupling system according to claim 14,
wherein the light collecting liquid crystal optical element has a liquid crystal layer having a liquid crystal compound, and
the liquid crystal layer has a liquid crystal alignment pattern in which an orientation of an optical axis derived from the liquid crystal compound changes while continuously rotating toward one in-plane direction, in a radial shape from an inside toward an outside.

16. An optical communication device comprising:
the optical coupling system according to claim 2.

17. The optical coupling system according to claim 3,
wherein the liquid crystal optical element is a light collecting liquid crystal optical element that collects incident light to the emit light toward the grating coupler.

* * * * *